US00RE44197E

(19) United States
(12) Reissued Patent
Ono et al.

(10) Patent Number: US RE44,197 E
(45) Date of Reissued Patent: May 7, 2013

(54) DISPLAY DEVICE LIGHTING UNIT

(75) Inventors: Satoshi Ono, Taki-gun (JP); Mitsuhiro Takeguchi, Matsusaka (JP)

(73) Assignee: Sharp Kabushiki Kaisha, Osaka (JP)

(21) Appl. No.: 12/963,422

(22) Filed: Dec. 8, 2010

Related U.S. Patent Documents

Reissue of:
(64) Patent No.: 7,461,963
Issued: Dec. 9, 2008
Appl. No.: 11/033,153
Filed: Jan. 12, 2005

(30) Foreign Application Priority Data

Jan. 14, 2004 (JP) ..... 2004-006997
Jul. 30, 2004 (JP) ..... 2004-223957
Nov. 26, 2004 (JP) ..... 2004-343134

(51) Int. Cl.
*F21V 19/00* (2006.01)
*F21V 21/00* (2006.01)

(52) U.S. Cl.
USPC ..... 362/634; 362/614; 362/216; 362/260

(58) Field of Classification Search ..... 362/614, 362/634, 561, 216, 225, 260, 390, 396, 632; 349/58, 70; 248/50
See application file for complete search history.

(56) References Cited

U.S. PATENT DOCUMENTS 3,210,532 A 10/1965 Woofter et al.
4,395,617 A 7/1983 Maeda et al.
4,395,619 A 7/1983 Harigai
4,598,343 A 7/1986 Sorrell
4,870,484 A 9/1989 Sonehara
5,477,423 A 12/1995 Fredriksz et al.
5,479,328 A 12/1995 Lee et al.
5,503,353 A 4/1996 Degand
5,575,558 A 11/1996 Coushaine et al.
5,797,675 A 8/1998 Tanner, Jr.
5,908,237 A 6/1999 Devir et al.

(Continued)

FOREIGN PATENT DOCUMENTS

EP 0 348 979 A2 1/1990
JP 48-102466 U 12/1973

(Continued)

OTHER PUBLICATIONS

Official communication issued in the International Application No. PCT/JP2006/305078, mailed on May 30, 2006.

(Continued)

*Primary Examiner* — Peggy A. Neils
(74) *Attorney, Agent, or Firm* — Keating & Bennett, LLP

(57) ABSTRACT

The display device lighting unit comprises a light source lamp and a lamp holder, which has one or an arbitrary combination of the following features: (1) the lamp holder comprises a plurality of supporting members at least partly integrated, (2) the light source lamp or lamps have a curved portion and each is supported by supporting members of the lamp holder or holders at least partly at the respective curved portions, (3) the lamp holder has, for example, projections, depressions and so on that reduces the supporting area of the supporting members, (4) means for fixing the lamp holder within the display device lighting unit after the fixation of light source lamp on the supporting members of the lamp holder or holders in which at least one fixing member of the lamp holder or holders have a structure resulting from division into two.

8 Claims, 17 Drawing Sheets

U.S. PATENT DOCUMENTS

| | | | | |
|---|---|---|---|---|
| 6,206,545 | B1 | 3/2001 | Yan | |
| 6,641,281 | B2 | 11/2003 | Cheng | |
| 6,669,356 | B2 | 12/2003 | Okuno | |
| 6,722,773 | B2 | 4/2004 | Tsai et al. | |
| 6,749,315 | B2 | 6/2004 | Moon et al. | |
| 6,783,256 | B2 | 8/2004 | Moon | |
| 6,974,221 | B2 | 12/2005 | Wu et al. | |
| 6,984,056 | B2 | 1/2006 | Amano et al. | |
| 7,057,678 | B2 * | 6/2006 | Ishida et al. | 349/58 |
| 7,059,736 | B2 | 6/2006 | Yu et al. | |
| 7,070,313 | B2 | 7/2006 | Kim et al. | |
| 7,077,548 | B2 | 7/2006 | Basey | |
| 7,090,376 | B2 | 8/2006 | Kang et al. | |
| 7,097,327 | B1 | 8/2006 | Barton | |
| 7,101,069 | B2 | 9/2006 | Yu et al. | |
| 7,137,726 | B2 | 11/2006 | Lee et al. | |
| 7,201,351 | B2 | 4/2007 | Stigler | |
| 7,207,710 | B2 | 4/2007 | Kim | |
| 7,256,539 | B2 | 8/2007 | Yu | |
| 7,677,757 | B2 | 3/2010 | Takata et al. | |
| 2002/0149713 | A1 | 10/2002 | Ishida et al. | |
| 2003/0218877 | A1 | 11/2003 | Moon | |
| 2004/0012971 | A1 | 1/2004 | Tsai et al. | |
| 2004/0156183 | A1 | 8/2004 | Kim | |
| 2004/0257792 | A1 | 12/2004 | Yu et al. | |
| 2005/0047173 | A1 | 3/2005 | Kohno | |
| 2005/0225992 | A1 | 10/2005 | Idei et al. | |
| 2005/0270803 | A1 | 12/2005 | Tsai et al. | |
| 2005/0281039 | A1 | 12/2005 | Yeh | |
| 2006/0072343 | A1 | 4/2006 | Shimizu | |
| 2009/0073675 | A1 | 3/2009 | Takata et al. | |
| 2010/0128466 | A1 | 5/2010 | Takata et al. | |

FOREIGN PATENT DOCUMENTS

| | | | |
|---|---|---|---|
| JP | 60-45481 | U | 3/1985 |
| JP | 62-23085 | U | 2/1987 |
| JP | 4-40409 | U | 4/1992 |
| JP | 05-67021 | U | 9/1993 |
| JP | 5-251043 | A | 9/1993 |
| JP | 6-45040 | A | 2/1994 |
| JP | 06-95110 | A | 4/1994 |
| JP | 7-72476 | A | 3/1995 |
| JP | 7-72481 | A | 3/1995 |
| JP | 8-55608 | A | 2/1996 |
| JP | 8-271896 | A | 10/1996 |
| JP | 08-291881 | A | 11/1996 |
| JP | 9-330613 | A | 10/1997 |
| JP | 3041873 | * | 10/1997 |
| JP | 3041873 | U | 10/1997 |
| JP | 9-330613 | A | 12/1997 |
| JP | 10-207406 | A | 8/1998 |
| JP | 10-326517 | A | 12/1998 |
| JP | 11-329040 | A | 11/1999 |
| JP | 11-337942 | A | 12/1999 |
| JP | 2000-322915 | A | 11/2000 |
| JP | 2000-331518 | A | 11/2000 |
| JP | 2001-076527 | A | 3/2001 |
| JP | 2001-210126 | A | 8/2001 |
| JP | 2002-100233 | A | 4/2002 |
| JP | 2002-268573 | A | 9/2002 |
| JP | 2002-311418 | A | 10/2002 |
| JP | 2003-7117 | A | 1/2003 |
| JP | 2003-36723 | A | 2/2003 |
| JP | 2003-346541 | A | 12/2003 |
| JP | 2003346541 | | 12/2003 |
| JP | 2004-022287 | A | 1/2004 |
| JP | 2004-039476 | A | 2/2004 |
| JP | 2004-139871 | A | 5/2004 |
| JP | 2004-158224 | A | 6/2004 |
| JP | 2004-207196 | A | 7/2004 |
| JP | 2004-303538 | A | 10/2004 |
| JP | 2004-327328 | | 11/2004 |
| JP | 2004-327328 | A | 11/2004 |
| KR | 1991-0010106 | | 12/1991 |
| KR | 1991-0010106 | B1 | 12/1991 |
| KR | 2001084102 | A | 9/2001 |
| TW | 591300 | B | 6/2004 |
| TW | 246574 | B | 1/2006 |

OTHER PUBLICATIONS

International Search Report issued in a counterpart International Application No. PCT/JP2005/015939; mailed on Nov. 22, 2005.

International Search Report issued in a counterpart International Application No. PCT/JP2005/020475 mailed on Jan. 24, 2006.

International Search Report issued in a counterpart International Application No. PCT/JP2005/020476; mailed on Jan. 24, 2006.

International Search Report issued in a counterpart International Application No. PCT/JP2005/014667; mailed on Nov. 22, 2005.

International Search Report issued in a counterpart International Application No. PCT/JP2005/020473; mailed on Jan. 24, 2006.

Official communication issued in a counterpart Japanese Application No. 2006-520459, mailed on Nov. 28, 2006.

Official communication issued in a counterpart Japanese Application No. 2006-520459, mailed on Feb. 27, 2007.

Takata et al.; "Lamp Holder, Backlight Device Using the Same, and Display Using the Same"; U.S. Appl. No. 11/720,175, filed May 24, 2007.

Kentaroh Aoki et al.; "Lighting Device for Display Device and Display Device"; U.S Appl. No. 11/557,345, filed Nov. 7, 2006.

Hiroki Azuma et al.; "Lamp Holding Apparatus, Lighting Device for Display Device Including Same, Display Device Including Same and Liquid Crystal Display Device Includinglighting Device for Display Device"; U.S. Appl. No. 11/560,259, filed Nov. 15, 2006.

Yoshiki Takata et al.; "Lamp Holding Apparatus, Backlight Device for Display Device Including Same, Display Device Including Same and Liquid Crystal Display Device Including Backlight Device for Display Device"; U.S. Appl. No. 11/560,272, filed Nov. 15, 2006.

Kentaroh Aoki et al.; "Illuminating Apparatus for Displaying Apparatus and Displaying Apparatus"; U.S. Appl. No. 11/719,612, filed May 17, 2007.

Takata; "Chassis for an Illuminating Unit, and an Illuminating Unit, a Display Device and a Television Receiver Incorporating the Chassis"; U.S. Appl. No. 11/914,993, filed Dec. 17, 2007.

Takata et al.; "Lamp Holder, Backlight Device Using the Same, and Display Using the Same"; U.S. Appl. No. 12/692,707, filed Jan. 25, 2010.

* cited by examiner

DISPLAY DEVICE LIGHTING UNIT

Matter enclosed in heavy brackets [ ] appears in the original patent but forms no part of this reissue specification; matter printed in italics indicates the additions made by reissue.

REFERENCE TO RELATED APPLICATIONS

This Nonprovisional application claims priority Under 35 U.S.C. §119(a) on Patent Application No. 2004-6997 filed in Japan on Jan. 14, 2004, No. 2004-223957 filed in Japan on Jul. 30, 2004, and No. 2004-343134 filed in Japan on Nov. 26, 2004, the entire contents of which are hereby incorporated by reference.

BACKGROUND OF THE INVENTION

1. Field of the Invention

The present invention relates to a display device lighting unit, a lamp holder and a liquid crystal display device. More particularly, it relates to a display device lighting unit and a lamp holding system therefor, which are suited for use in constituting a backlight for a liquid crystal display device of the transmission or semitransmission type having a transmission region in the liquid crystal display element and to a liquid crystal display device equipped with the display device lighting unit.

2. Prior Art

A display device lighting unit illuminates a device having light-based display means and is widely used in the backlight section of a liquid crystal display device, for instance. Thus, the liquid crystal panel itself in a liquid crystal display device does not emit light and, therefore, a liquid crystal display device of the transmission or semitransmission type generally has a display device lighting unit as a backlight section for giving light to the liquid crystal panel. Such a liquid crystal display device is indispensable for information or video display means and, in recent years, high quality products in which the characteristics of liquid crystal displays, namely their being low in electricity consumption, light in weight and thin, are made use of have attracted attention and the field of their application has become widened in display panels of household video monitors, monitors for industrial machines and tools, portable information terminals and so forth.

Meanwhile, the backlight for use in a liquid crystal display device currently includes two main types, namely the edge light type (side light type) and the just-under-panel type (direct type). A structural feature of the edge light type is that a rod-shaped light source 102, such as a cold cathode fluorescent tube, is disposed on the side of a transparent plate 101 called a light guide plate, as shown in FIG. 10. In this case, light enters the light guide plate 101 from the light source and exits from inside the light guide plate 101 toward the liquid crystal panel 105 by frosting, printing, prismatic and the like. Whereas the resulting module can be made thin in this manner, an increase in light source as made in an attempt to increase the brightness directly influences the thickness of the module. Further, a heavy continuous body made of an acrylic, for instance, is used as the so-called light guide plate 101 and, therefore, when the size is large and exceeds 20 inches, its weight is very heavy.

On the other hand, it is a structural feature of the direct type that a display device 117, such as a liquid crystal panel, is provided, at the back thereof, with a plurality of rod-shaped light sources 113, such as cold cathode fluorescent tubes, as shown in FIG. 11. In this case, the light from the rod-shaped light sources 113 almost directly enters the display element 117, and a diffuser 115 for diffusing the light from the rod-shaped light sources uniformly over the screen and an optical sheet 116 comprising a diffusing sheet, a condensing lens, a light polarization selective reflecting/transmitting sheet and a protective/diffusing sheet, among others, are disposed and, then, the display element 117 is disposed. This constitution has the following advantages: a large number of light sources 113 can be disposed and the quantity of light can be increased, the loss of light is small owing to the direct incidence of light on the display element 117, and large displays exceeding 20 inches can be realized with ease. On the other hand, the number of light sources 113 is great and the number of relevant parts becomes increased, and the driving circuit for the light source 113 becomes a large-scaled one. Furthermore, the electricity consumption increases, and the total heat generation becomes increased.

The progress of such liquid crystal display devices began with small-sized display elements, and the market therefor has been broadened to displays for notebook personal computers (PCs) and cellular phones with the development of the relevant technologies. In these fields, the main display size is up to about 15 inches and it is a necessary condition that the devices be thin. Thus, from the commercial value viewpoint, the edge light system has been employed in those fields.

At present, liquid crystal display devices are getting larger and larger as a result of completion of a process using larger mother glass sheets, among others, and now occupy a good position among household televisions (20-inch to 50-inch). For such televisions, brightness is one of the important performance characteristics as compared with PCs and cellular phones. For example, the specification value of brightness for PC monitors is generally about 250 candelas (cd/m$^2$), whereas the brightness specification for televisions as currently required is at least 500 candelas (cd/m$^2$). In view of such background, the direct backlight system is appropriate for providing large-sized and high-brightness backlights.

Regarding lighting units for display devices which can be applied to the conventional liquid display devise, there have been disclosed a lamp holder made of a flexible transparent material and having the shape of an arc holder with a partial opening (cf. e.g. Japanese Kokai Publication 2001-210126, pages 1-2), a backlight device in which the reflector for condensing the light emitted from a light source to the light guide plate is made of a metal and is supporting the light source (cf. e.g. Japanese Kokai Publication H10-207406, pages 1-2), and a fluorescent lamp unit in which a fluorescent lamp is contained in the inside of a gutter-shaped unit holder and, between the fluorescent lamp and unit holder, there is disposed a lamp holder made of a light-transmitting or light-reflecting synthetic resin (cf. e.g. Japanese Kokai Publication H09-330613, pages 1-2).

However, there is still room for contrivance for adapting these devices to the field of liquid crystal displays, among others, where higher quality and larger sizes are required for improving the commercial value thereof and at the same time reductions in cost are required. For example, in developing liquid crystal television sets, in particular, there is room for contrivance for improving the characteristics thereof by bringing advantages, from the production viewpoint, by reducing the number of parts, and by enabling reductions in dispersion of display quality by decreasing the deviations in assemblage in the process of producing lighting devices or units, or attaining higher levels of quality and commercial value by preventing the display quality from lowering due to the structure of lighting devices.

Further, a lighting device has been disclosed in which a plurality of fluorescent lamps are commonly connected at one external electrode side and at the other external electrode side, respectively, and the whole is connected to one booster lighting circuit to thereby stabilize the fluorescent lamps (cf. e.g. Japanese Kokai Publication 2003-36723, pages 1-2). In this lighting device, a plurality of fluorescent lamps are connected to one lighting circuit by means of a lamp fixer made of a conductive metal and having a plurality of grooves having the shape of a U in section. With respect to such a device, however, there is room for contrivance for providing a product showing higher display performance characteristics for application thereof to a liquid crystal television and the like which requires a large size and high-brightness backlight or in cases where the lamp fixing portions are made of a rubber or plastic.

Meanwhile, there is disclosed a lighting device equipped with a pair of supporting mechanisms for supporting a bent type discharge lamp between casing side wall portions in a sandwiching and fitting manner (cf. e.g. Japanese Kokai Publication H07-72476, pages 1-2). In this lighting device, one bent portion of the lamp is supported at one site. With devices of this kind, however, deviations may result in the step of mounting lamps and such deviations may influence the display quality or reliability. In the case of large-sized, high-brightness lighting devices, in particular, it is important to decrease such deviations in mounting lamps. Therefore, in such a prior art lighting device, there is room for contrivance for improving the shape of the supporting member by which the bent portion of a lamp is to be fixed.

SUMMARY OF THE INVENTION

It is an object of the present invention, which has been made in view of the above-discussed state of the art, to provide a display device lighting unit capable of bringing about improvements in display quality and in shock resistance, a lamp holder, and a liquid crystal display device equipped with the display device lighting unit while reducing the number of parts/members and effectively preventing deviations in the step of assemblage in the production process thereof.

In the course of various investigations made by them in an attempt to develop a display device lighting unit which can be suitably used, for example, as the backlight of a liquid crystal display device, for example a large-sized, high-brightness backlight, the present inventors first paid attention to the fact that when light source lamps are individually supported by respective supporting members of a plurality of lamp holder, deviations in the relevant production step and curving of light source lamps 113 and other deviations are readily caused, as shown in FIG. 12, and these deviations result in deviations in display quality, and they found that when a lamp holder resulting from integration of the plurality of supporting members is used, the number of parts/members can be reduced and lighting units capable of realizing high quality characteristics can be stably provided.

They further paid their attention to the fact that light source lamps having a curved portion, for example U-shaped tubes, are useful as backlights constituting liquid crystal display devices, although the conventional fluorescent lamps conventionally used as light source lamps are straight and independent from one another. When, for example, U-shaped tubes are used, one U-shaped tube corresponds to two straight tubes, the number of light unit parts can be reduced to half and, thus, the number of parts/members can be markedly reduced. The electricity consumption in cold cathode fluorescent tubes in ordinary use is correlated with the voltage drop graph, as shown in FIG. 13, and, therefore, the reduction in the number of electrodes as resulting from the use of U-shaped tubes makes it possible to markedly reduce the electricity consumption. In other words, the cathode fall substantially depends on the work function of the metal used, hence the reduction in the number of electrodes is effective in reducing the electricity consumption. In this case, one U-shaped tube corresponds to two straight tubes and, therefore, the number of electrodes is reduced to half although the total length of the light sources 113 is substantially equal. A lighting unit equipped with such light source lamps having a curved portion and further equipped with a light diffusing layer is suited for use as a direct type backlight, for instance; in particular when a large size is required, it is very advantageous.

It was found that when such light source lamps having a curved portion are used, the method of supporting the light source lamps is important for stabilizing the display quality and that when at least a part of the curved portion of each lamp is supported by a supporting member of a lamp holder, the light source lamp is prevented from coming into direct contact with a housing frame or other members and, at the same time, other effects can be produced, namely the standardization of assembly works in the process of production of such devices becomes possible and the display quality can be stabilized.

The inventors further paid their attention to the fact the regions where light source lamps are supported each by a supporting member of a lamp holder become dark as compared with the remaining regions and that dissolution of this problem, if possible, might result in realization of final products with high quality and high commercial value. And, they found that it is effective in such a display device lighting unit to reduce the lamp-supporting area in the supporting section of the lamp holder. It is estimated that the temperature distribution of a light source lamp differs between the sites of supporting members of the lamp holder and other sites and this is related to the uniformity in brightness of the lighting unit. Thus, the reduction in the lamp-supporting area at supporting members of the lamp holder makes it possible to keep the temperature distribution of light source lamps uniform and improve the uniformity of brightness.

The inventors made further investigations in search of a lamp holder capable of reducing deviations in the assembly of light source lamps as far as possible and found that when the lamp holder is constituted of supporting members and fixing members and at least one of the fixing members is structurally divided into two or when the lamp holder is fixed within the display device lighting unit after a light source lamp is fixed on the supporting members of the lamp holder, improvements can be attained with respect to the deviations in lamp positioning in the vertical direction (in the direction of the z axis). They further found that when the curved portion of each light source lamp is supported by a plurality of supporting members or when the curved member is covered with a supporting member along the curved shape thereof, improvements can be attained with respect to the deviations in lamp positioning in the crosswise directions (in the directions of the x and y axes), leading to improved display quality characteristics.

Based on these findings, the inventors came to realize that the problems mentioned above can be successfully solved by employing the following means either singly or in combination in the display device lighting unit: (1) integration of lamp-supporting members of the lamp holding unit into one piece, (2) supporting of light source lamps having a curved portion at the respective curved portions, (3) means for reducing the supporting area of the supporting members of the lamp holder, (4) means for fixing the lamp holder within the display device lighting unit after light source lamp fixation on those supporting/fixing members of the lamp holder, for example, the fixing member having a structure resulting from division into two. Thus, the inventors have now completed the present invention.

Thus, the present invention provides a display device lighting unit comprising at least one light source lamp and at least one lamp holder in which the lamp holder comprises a plurality of supporting members, with at least a part of the supporting members being integrated.

The invention also provides a display device lighting unit comprising at least one light source lamp and at least one lamp holder in which the light source lamp has a curved shape and at least a part of the curved portion is supported by at least one supporting member of the lamp holder.

The invention further provides a display device lighting unit comprising at least one light source lamp and at least one lamp holder in which the lamp holder is constituted so as to comprise a supporting member having a means for reducing the lamp supporting area.

The invention further provides a display device lighting unit comprising at least one light source lamp and at least one lamp holder in which the lamp holder comprises a supporting member and a fixing member, with at least one of the fixing member having a structure resulting from division into two.

The invention further provides a display device lighting unit comprising at least one light source lamp and at least one lamp holder in which the display device lighting unit has a structure such that the lamp holder is fixed in the display device lighting unit after fixation of the light source lamp on at least one supporting member of the lamp holder.

EXPLANATION OF SYMBOLS

Figure 1A:
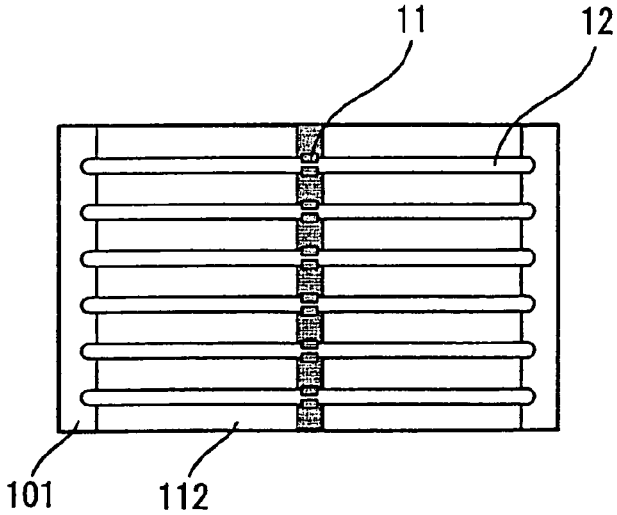
FIG. 1A is a schematic plan view showing an example of the lamp holder having supporting members integrated into one piece in the display device lighting unit of the invention.

11, 22, 31, 33, 34, 35, 36, 37a, 38a, 38b, 38c, 39, 40, 51, 61, 71, 81, 83, 91, 121: lamp holder
12: straight type fluorescent tube
21: U-shaped fluorescent tube
32: hollow portion in the lamp holder 31
33', 34', 35', 36', 37a', 37b', 38a', 38b', 38c', 81', 83', 91': supporting member
33", 34", 35", 36", 37a", 38a", 38b", 38c", 81", 83", 91": fixing member
40": projection on the lamp holder 31
41: housing frame
52: adhesive material
82, 84: projection
101: light guide plate
102: rod-shaped light source
103: lamp reflector (housing frame)
104: optical sheet
105: liquid crystal panel
111: sheet metal
112: high reflectance resin
113: rod-shaped light source
114: housing frame (lamp frame)
115: diffusing plate
116: optical sheet
117: display element (liquid crystal panel element)
118: frame
131: GND harness wire
132: double coated adhesive tape

PREFERRED MODES OF EMBODIMENT

In the following, the present invention is described in detail.

The display lighting unit of the invention comprises at least one light source lamp and at least one lamp holder, and such lighting unit is suited for use as a lighting unit for a liquid crystal display. In the practice of the invention, it is preferably used as a direct type backlight, in particular. It is also applicable as an edge light type backlight. As a preferred embodiment of the lamp holder, there may be mentioned the form constituted of a light source lamp supporting (holding) portion or portions (herein referred to also as supporting member or members) and a portion or portions to be used in fixation to a backlight angle or reflector (herein referred to also as fixing member or members). The lamp holder is referred to also as lamp holder.

When the lighting unit is of the direct type, there may be mentioned, among others, the form comprising a light source lamp or lamps disposed on a reflector via a supporting member or members of the lamp holder or holders. In such a constitution, one or a plurality of light source lamps are used, and the invention is preferably applied to those cases where a plurality of lamps are used.

When the lighting unit is of the edge light type, there may be mentioned, among others, the form comprising one or more light source lamps disposed on one or more sides of a transparent resin-made light guide plate via a supporting member or members of the lamp holder or holders.

The lighting unit of the invention may comprise other Constituent members or parts in addition to the above-mentioned essential constituent members.

In applying the above lighting unit to a liquid crystal display device, the lighting unit is generally constituted by placing light source lamps on a reflector and further piling up various optical sheets such as a diffuser, diffusing sheet, light condensing lens, polarization-selective reflecting/transmitting sheet, protective/diffusing sheet, electromagnetic shielding sheet (conductive sheet, ITO sheet), etc., together with a liquid crystal panel.

The display device lighting unit of the present invention has one or an arbitrary combination of the following four features: (1) the form in which the lamp holder comprises a plurality of supporting members, with at least a part of the supporting members being integrated, (2) the form in which the light source lamp has a curved shape and at least a part of the curved portion is supported by at least one supporting member of the lamp holder, (3) the form in which the lamp holder is constituted so as to comprise a supporting number having a means for reducing the lamp supporting area, (4) the form in which the display device lighting unit has a structure such that the lamp holder is fixed in the display device lighting unit after fixation of the light source lamp on at least one supporting member of the lamp holder, for example, the form in which at least one of the fixing number in the lamp holder has a structure resulting from division into two.

In case (1) among the above-mentioned forms of the lighting unit, two or more supporting members so far separately disposed on a plurality of lamp holders are now integrated into one lamp holder and, as a result, the number of parts/members can be reduced, the distance between supporting members can be made constant with ease, light source lamps can be supported precisely at constant intervals, and display devices excellent in display quality can be produced at low cost. In case (2), light source lamps can be supported effectively and precisely and, further, the light source lamps and the state of disposition thereof can be improved in shock resistance. Furthermore, the shock resistance of the state of disposition of light source lamps can be more effectively improved by supporting the light source lamps in the straight portion and curved portion thereof.

These forms include, for example, the embodiment in which a light source lamp or lamps each is supported, at a plurality of sites in the straight portion thereof, by a lamp holder having supporting members integrated into one piece, and the embodiment in which a light source lamp or lamps having a curved portion are supported, at a plurality of sites in the curved portion thereof, by a lamp holder or holders having supporting members integrated into one piece.

As the means for reducing the lamp supporting area in the above-mentioned form (3), there may be mentioned, for example, the embodiment in which each supporting member is provided with projections so that the area of contacting of a light source lamp with the relevant supporting member of the lamp holder may be reduced. In addition to such embodiment, any form capable of reducing the area of contacting between a light source lamp and the relevant supporting member of the lamp holder can produce the effects of the invention. As a result, the temperature distribution in each light source lamp can be made uniform and, therefore, it becomes possible to improve the uniformity in brightness of the lighting unit. The supporting members of the lamp holder are preferably made of a material low in thermal conductivity.

In the above-mentioned form (4), the lamp holder judiciously comprises supporting members and fixing members with at least one of the fixing members having a structure resulting from division into two. With a lamp holder having such a constitution, a light source lamp can be fixed within the relevant supporting member of the lamp holder through the corresponding fixing member by opening and closing the fixing member before fixation to the backlight angle or reflector and, after fixation of the fixing member with the light source lamp held in the supporting member, the fixation member cannot be opened or closed any longer. As a result, the light source lamp can be maintained at a sufficient level of holding strength.

As the manner of fixation of a lamp holder after light source lamp fixation on a supporting member or members of the lamp holder to a backlight angle (e.g. sheet metal) in the display device lighting unit, there may be mentioned, for example, the embodiment in which the lower part (fixing member) of the lamp holder has a shape capable of opening and closing in the downward direction (in the direction toward the backlight angle) and, after light source lamp fixation in the relevant supporting member of the lamp holder through the lower part (fixing member), the lower part (fixing member) of the lamp holder is inserted into the backlight angle. In this case, the lower part (fixing member) of the lamp holder is preferably made of a material having a certain degree of freedom, for example a Si (silicone) rubber since the procedure for opening the lower part (fixing member) in the downward direction for light source lamp fixation and the procedure for insertion into the backlight angle become easy.

Such modes and forms bring about improvements with respect to deviations in lamp mounting. Now, referring to the drawings, the mounting of a light source lamp(s) in the step of assemblage is described in detail.

Figure 3A:
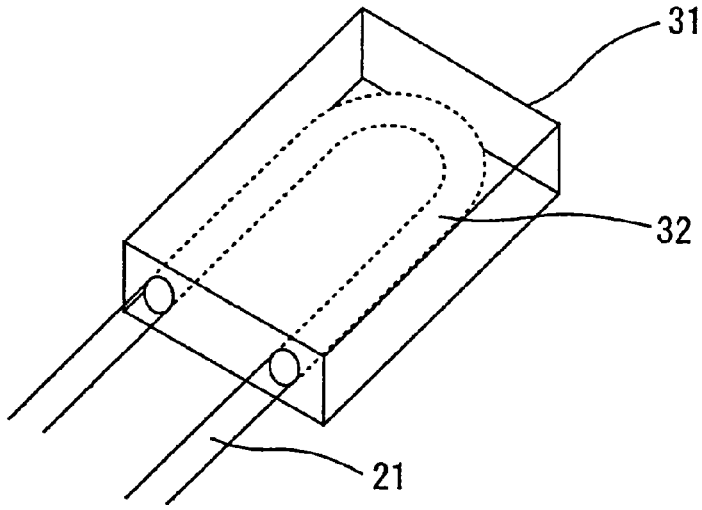
FIG. 3A is a schematic perspective view showing an example of the lamp holder for supporting the U-shaped portion of a U-shaped fluorescent tube in the display device lighting unit of the invention.
Figure 3B:
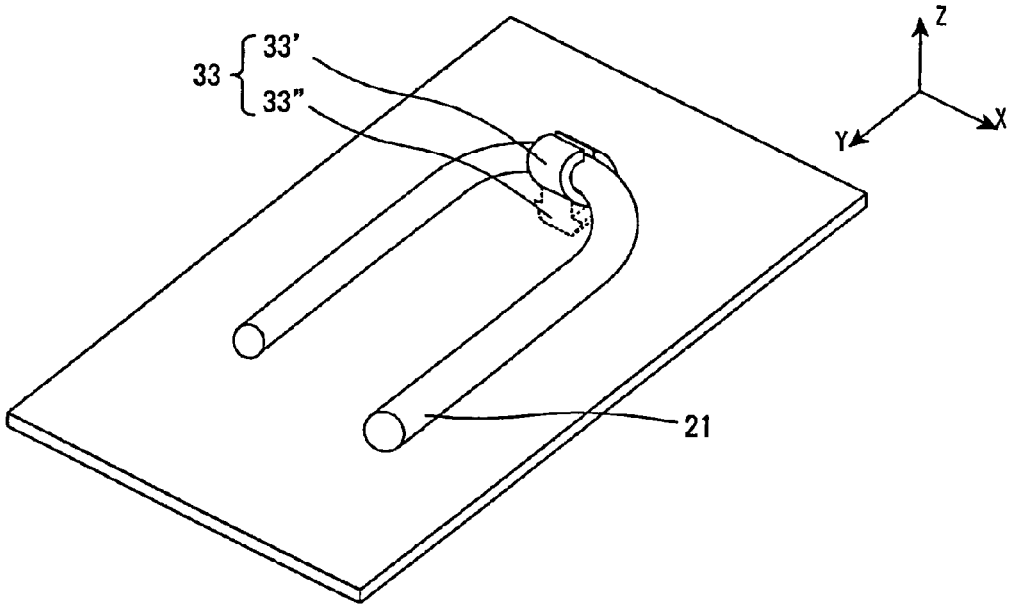
FIG. 3B is a schematic perspective view showing an example of the lamp holder for supporting the U-shaped portion of a U-shaped fluorescent tube in the display device lighting unit of the invention.
Figure 3C:
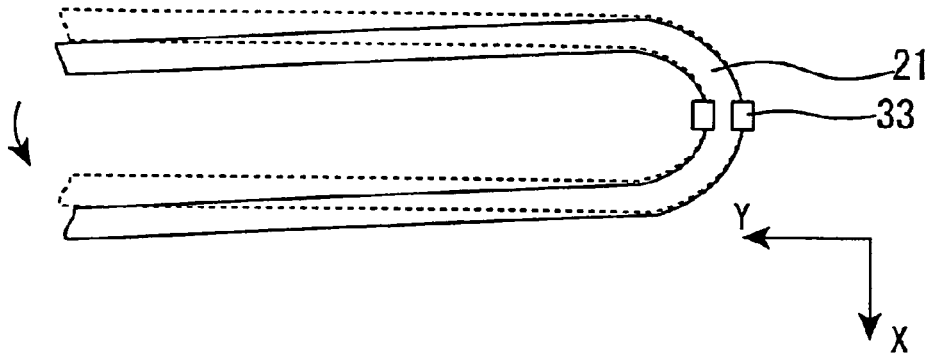
FIG. 3C is a schematic plan view illustrating the state after deviations, in the directions of x and y, of the U-shaped fluorescent tube in the lamp holder shown in FIG. 3B.
Figure 3D:
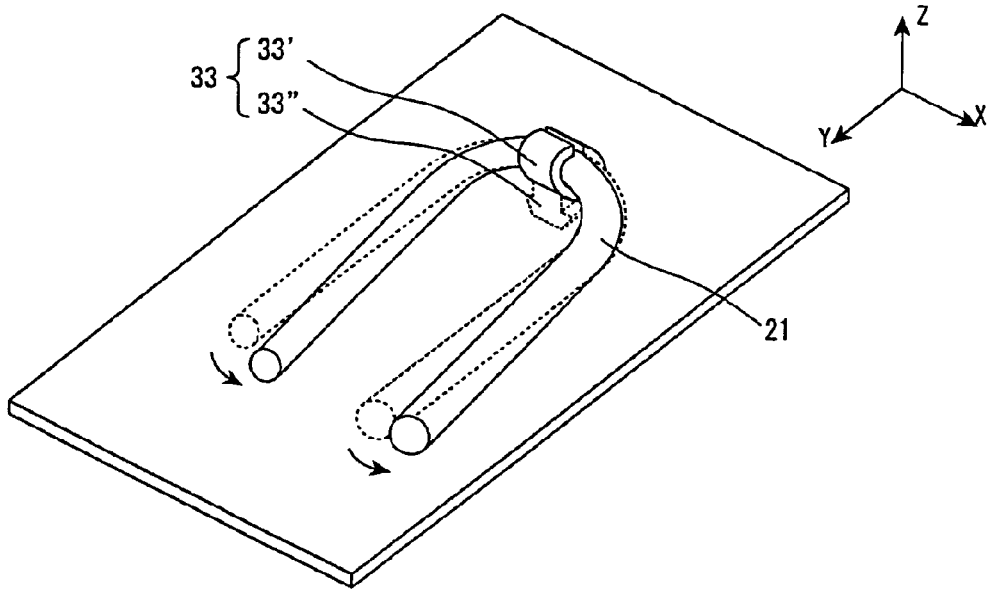
FIG. 3D is a schematic perspective view illustrating the state after deviations, in the directions of x and y, of the U-shaped fluorescent tube in the lamp holder shown in FIG. 3B.
Figure 3E:
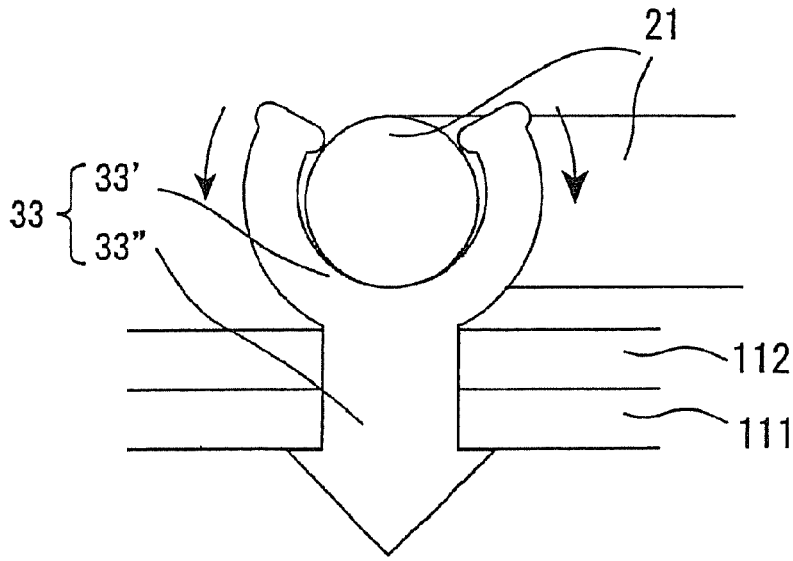
FIG. 3E is a schematic sectional view of the lamp holder shown in FIG. 3B.

FIG. 3A and FIG. 3B each shows an example of the U-shaped curved portion supporting form for a light source lamp having a curved portion. When a lamp holder formed of a Si rubber or the like is given a notch and a lamp is to be inserted therein, as shown in FIG. 3A, the mounting in the step of assemblage is difficult to perform. When the lower part (fixing member) of a lamp holder is fixed to a backlight angle in a display device lighting unit and then a light source lamp is fixed on the supporting member of the lamp holder, as shown in FIG. 3B, namely when the lower part (fixing member) of the lamp holder is inserted into the backlight angle and then the supporting member of the lamp holder is opened in the upward direction (in the direction opposite to the backlight angle) and the light source lamp is fixed in the supporting member, deviations in mounting position in the X direction shown in the figure may possibly be caused. Further, when the supporting member is made of a soft material, for example a Si rubber, deviations in the Y and Z directions may occur, possibly affecting the display quality and reliability of the display device. Referring to FIG. 3E schematically showing the cross section of the lamp holder shown in FIG. 3B, the confining force in the direction of the arrow in the figure is weak when a soft material such as a Si rubber is used and, therefore, deviations in the fixation in the Z direction may result. When such holders are applied to liquid display devices, in particular, there is the possibility of failure to prevent the deviations (shifts) in the directions of the X and Y axes, as shown in FIGS. 3C and 3D, to a satisfactory extent, hence failure to provide a higher and stabilized level of display quality than in the conventional art. In FIGS. 3C and 3D, the positions of U-shaped fluorescent tubes before shifting are indicated by dotted lines, and the positions indicated by solid lines are the positions after shifting in the directions of the arrows.

When a material lower in elasticity (freedom) than Si rubbers, for example a polycarbonate, is used, it is strong in the Z axis direction but may allow shifting in the X and Y axis directions, as shown in FIGS. 3C and 3D.

Figure 3F:
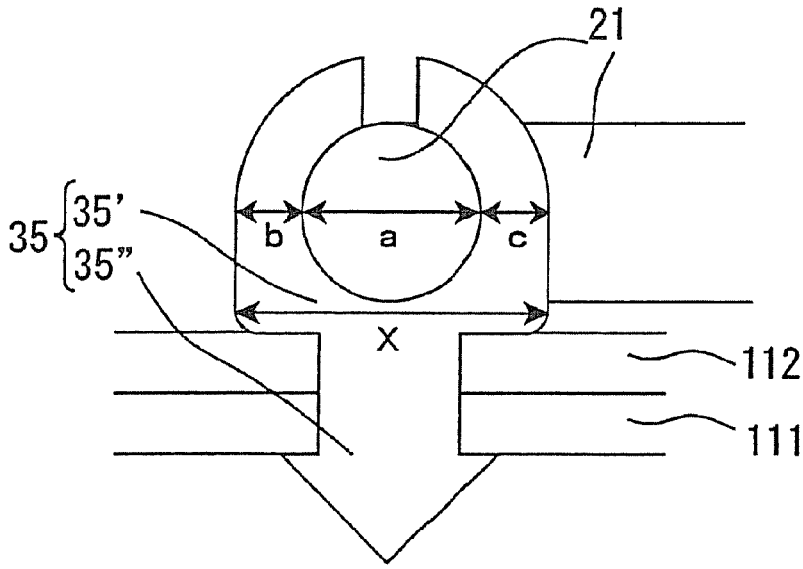
FIG. 3F is a schematic perspective view showing an example of the lamp holder where the area of a supporting member which comes into contact with the backlight angle is broadened.

As a means for solving the above problems, there may be mentioned the embodiment in which the area of contacting between a supporting member (upper part; part for holding a light source lamp) of the lamp holder and the backlight angle is enlarged as compared with the area of contacting between a fixing member (lower part; part for fitting with the backlight angle to fix the lamp supporting member in the display device) and the backlight angle, as shown in FIG. 3F. Thus, in a preferred embodiment of the display device lighting unit of the invention, the width of the bottom of the supporting member of the lamp holder is not smaller than the width of the light source lamp-holding portion (lamp-supporting portion when the portion holding the lamp). In this way, it becomes possible to suppress deviations in fixation of the lamp holder itself and stably dispose a light source lamp(s) on the backlight angle in the display device. In this embodiment, the supporting member of the lamp holder is preferably made of an elastomer (material having elasticity), for example a silicone rubber (Si rubber).

In the embodiment mentioned above, the width X of the bottom of the supporting member in the lamp holder is given as the sum of the length of contacting between the supporting member (upper part) and the fixing structure (backlight angle) and the width of the fixing member (lower part), and the width of the light source lamp-holding portion (a+b+c) is given as the sum of the diameter a of the light source lamp, the thicknesses b and c of the supporting member (upper part), and there is the relation $X \geqq (a+b+c)$.

Figure 14A:
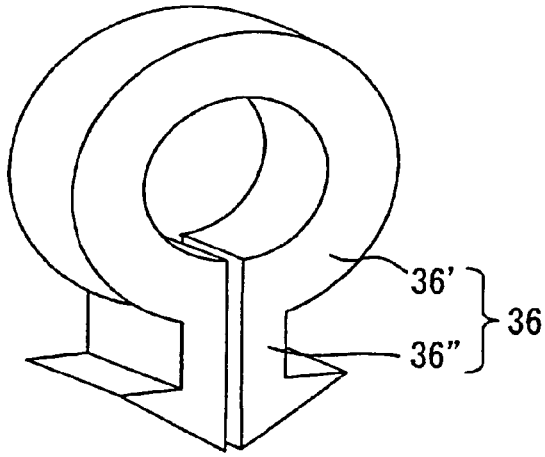
FIG. 14A is a schematic perspective view showing the shape of a lamp holding member when the lamp holder is fixed within the display device lighting unit after light source lamp fixation on a supporting member of a lamp holder in the display device lighting unit of the invention.
Figure 15A:
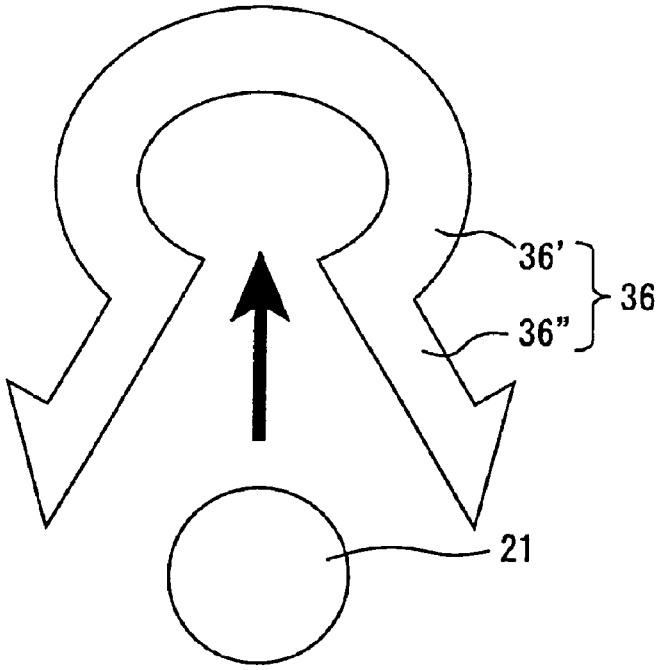
FIG. 15A is a schematic sectional view showing that the lower portions of the lamp holding member shown in FIG. 14A are opened for insertion of a light source lamp into the supporting member.
Figure 15B:
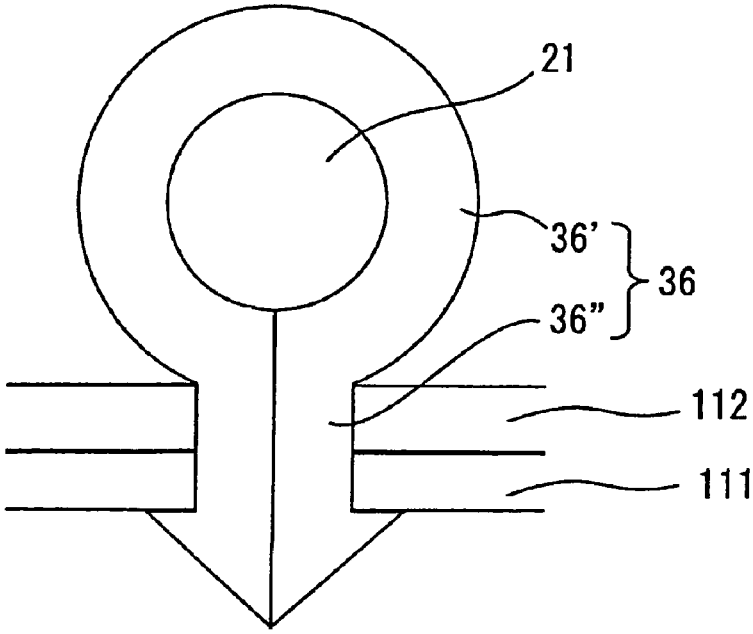
FIG. 15B is a schematic sectional view showing that the lamp holding member shown in FIG. 14, with the light source lamp inserted in the supporting member, is fixed to the backlight angle.

Further, for attaining a construction capable of minimizing the deviations in assemblage while considering the lamp mounting in the step of assemblage, the embodiment (a) is preferred which has a structure such that the fixing member(s) of the lamp holder is fixed in the display device lighting unit after light source lamp fixation on the supporting member(s)

of the lamp holder, for example the embodiment in which the lamp holder is constituted of supporting members and fixing members and at least one of the fixing members has a structure resulting from division into two. In this manner, shifting in the upward and downward directions (in the Z axis direction in FIG. 3B) is prevented, and a product more improved with respect to deviations in lamp mounting and stabilized in quality as a display device can be provided. The light source lamp(s) may have a curved shape or may not have any curved shape, although the above embodiment is judiciously applied to those having a curved shape. FIG. 14A shows a lamp holder suited for use in such embodiment. In this case, the lamp holder has a circular shape so that the supporting member (light source lamp-supporting portion) may fit the sectional shape of the light source lamp, and the fixing member (portion to fit the backlight angle for fixation of the lamp holder in the display device) is constituted so that it may be opened for insertion of the light source lamp into the supporting member and, as shown in FIG. 15A, the fixing member (portion for fixing the lamp holder in the display device) of the lamp holder is opened together with the supporting member (portion for supporting the light source lamp) thereof and, after insertion of the light source lamp into the supporting member, the fixing member is caused to fit the backlight angle for fixation, as shown in FIG. 15B.

Figure 14B:
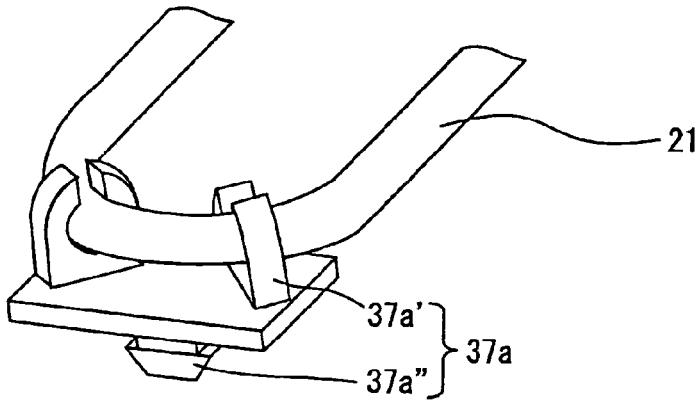
FIG. 14B is a schematic perspective view showing a light source lamp having a curved portion as supported, in the curved portion, on a plurality of supporting members of a lamp holder in the display device lighting unit of the invention.
Figure 14C:
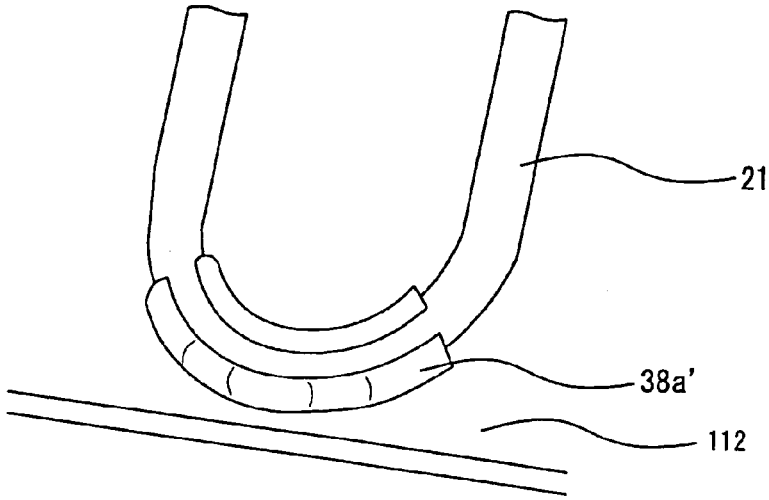
FIG. 14C is a schematic perspective view showing a light source lamp having a curved portion as supported on a supporting member of a lamp holder in a manner such that the curved portion is covered by the supporting member along the curved shape thereof in the display device lighting unit of the invention.

When, in the practice of the invention, the light source lamp has a curved shape, such embodiments as shown in FIGS. 14B and 14C are preferred. Thus, preferred are the embodiment (b) in which the light source lamp has a curved shape and the curved portion is supported by a plurality of supporting members of the lamp holder and the embodiment (c) in which the light source lamp has a curved shape and the curved portion is covered and supported, along the curved shape thereof, by a supporting member of the lamp holder. In this way, improvements are produced with respect to deviations in the lengthwise and breadthwise directions (in FIG. 3B, the X and Y axis directions) in lamp mounting. By saying that the light source lamp has a curved portion, it is not meant that the section of the light source lamp is curved but it is meant that the light source lamp, for example a U-shaped tube, when viewed from the top, has a curved portion in a portion thereof. Therefore, by saying that the curved portion of the light source lamp is covered, along the shape thereof, by the supporting member of the lamp holder, it is meant that a part or the whole of the curved portion of the light source lamp is supported by the supporting member which has a curved shape. In the case of a U-shaped tube, for instance, a part or the whole of the U-shaped curved portion of the light source lamp is covered and supported by the supporting member, which has a curved shape corresponding to the U-shaped curved portion, as shown in FIG. 14C. It is not always necessary for the curved shape of the supporting member to strictly correspond to the curved shape of the light source lamp. The curved shape of the supporting member relative to the curved shape of the light source lamp can be properly selected taking the ease of mounting, for instance, into consideration.

Figure 8A:
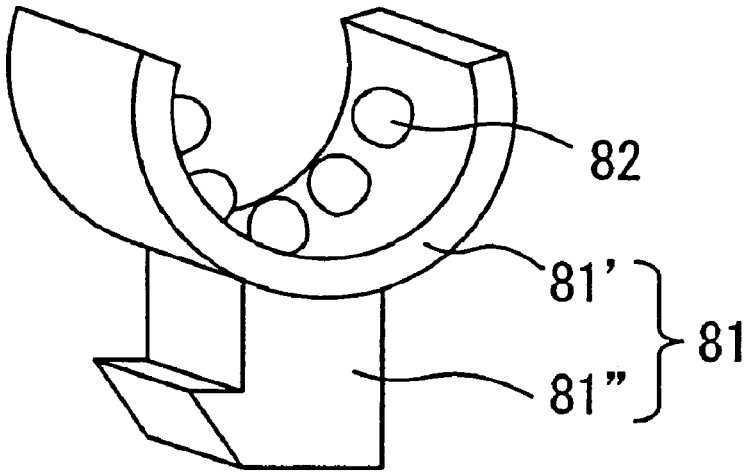
FIG. 8A is a schematic perspective view showing an example of the lamp holder having projections on the supporting member.
Figure 8B:
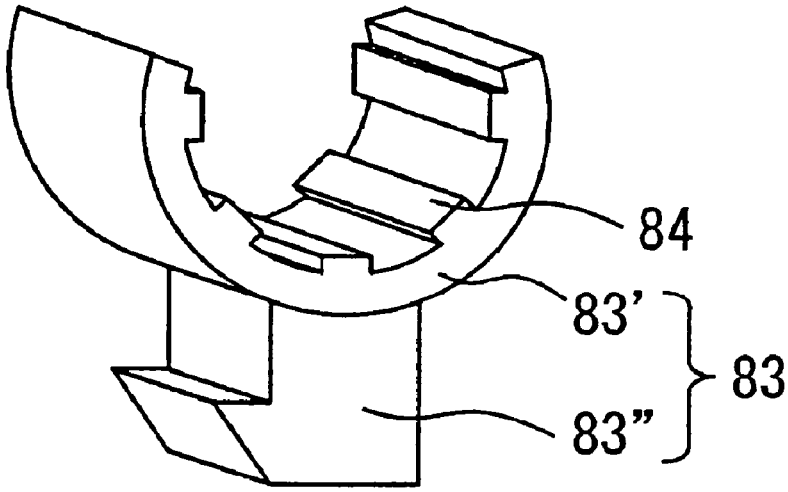
FIG. 8B is a schematic perspective view showing an example of the lamp holder having projections on the supporting member.

In the practice of the invention, the above embodiments (a) to (c) may be combined in fixing the light source lamp to the supporting member(s) of the lamp holder. In these embodiments, an integrated form resulting from integration of at least a part of a plurality of supporting members into one piece is preferred. Since the light source lamp shows a temperature gradient where it is held, whereby the brightness distribution is deteriorated and brightness deviations at low temperatures are caused and the life is affected, it is desirable that the lamp be supported in a manner such that the contacting area is reduced, irrespective of inside or outside the image display region. As for the supporting members for supporting the curved portion of the light source lamp which are disposed outside the image display region in many cases, it is also desirable that means be provided for reducing the lamp supporting area. Therefore, for example, when the supporting member shown in FIG. 14A, 14B or 14C is provided with projections having such a shape as shown in FIG. 8A or 8B, the contact area can be reduced to thereby improve or prolong the brightness characteristics and life, among others.

Figure 16A:
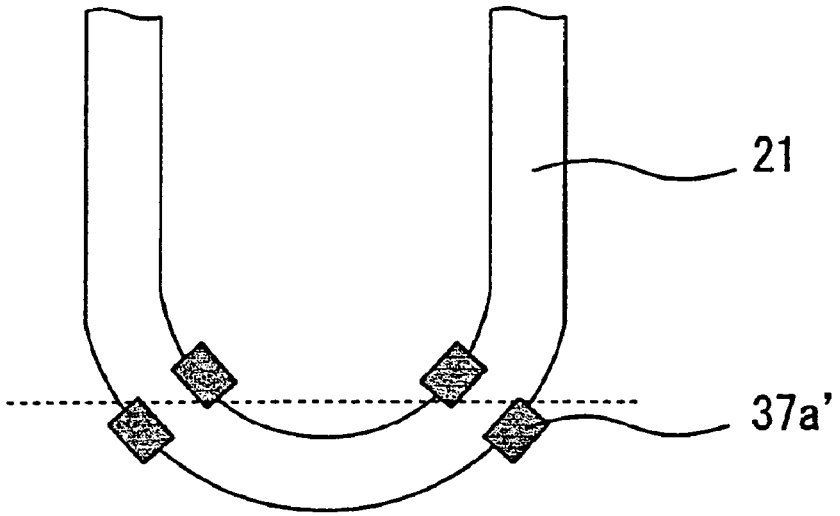
FIG. 16A is a schematic view showing the state of a light source lamp supported at two sites in the curved portion thereof by two supporting members disposed substantially on one and the same line, as viewed from the top.
Figure 16B:
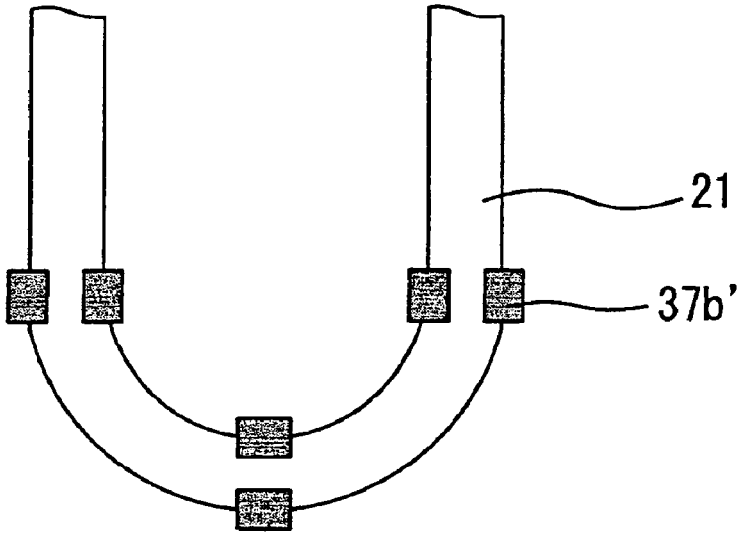
FIG. 16B is a schematic view showing the state of a light source lamp supported at three sites in the curved portion thereof, as viewed from the top.

In the above-mentioned embodiment (b), the sites of fixation of the light source lamp and the number of sites of fixation are not particularly restricted provided that the curved portion of the light source lamp is supported by a plurality of supporting members. It is desirable, however, that they be selected so that the deviations in lamp mounting in the X and Y axis directions may be effectively reduced. In the embodiment in which the curved portion of the lamp is supported at two sites (on both sides of the apex of the curved portion), for instance, the supporting members are preferably disposed so that they may occur almost on the same line, as shown in FIG. 16A. Further, the embodiment in which the curved portion of the lamp is supported at three sites (at the apex of the curved portion and on both sides thereof), as shown in FIG. 16B, is also preferred.

Figure 17A:
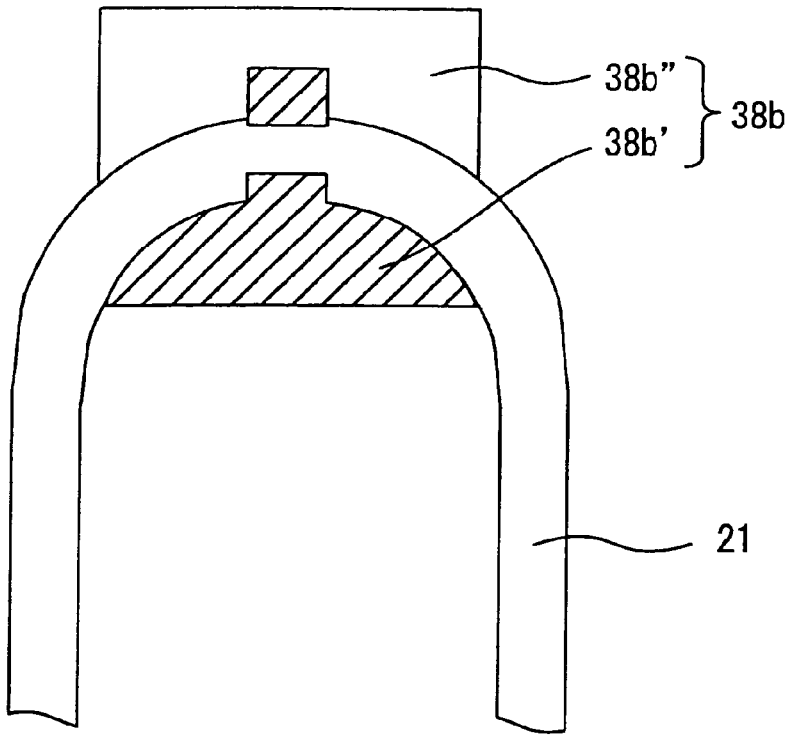
FIG. 17A is a schematic view showing the state of a light source lamp with one side of the curved portion thereof covered, along the shape thereof, with a supporting member of a lamp holder, as viewed from the top. In this case, one side, namely the inner side, of the curved portion is almost wholly supported.
Figure 17B:
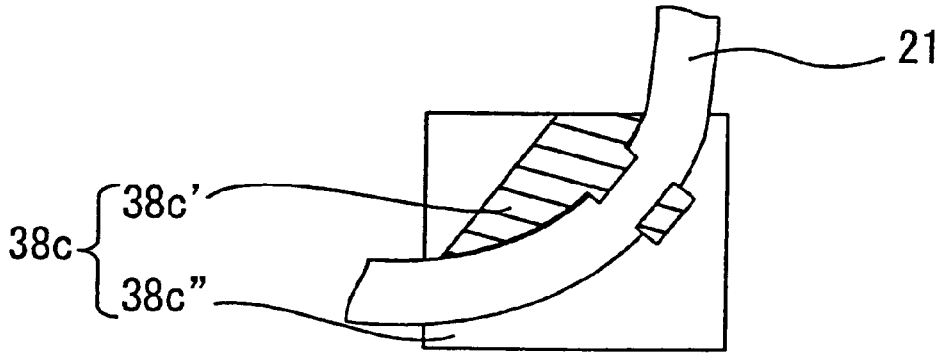
FIG. 17B is a schematic view showing the state of a light source lamp supported by a supporting member of a lamp holder in a manner such that one side of the curved portion of the light source lamp is covered, along the shape thereof, by the supporting member, as viewed from the top. In this case, one side of the curved portion in the inner side is partly supported.

In the embodiment (c) mentioned above, not only such an embodiment as shown in FIG. 14C but also the embodiment in which the curved portion of the light source lamp is supported by a supporting member along one side of the curved portion, as shown in FIG. 17, can make the shifting in the X and Y axis direction difficult to occur and thus can provide the assembly with small deviations in assemblage. The effects of the invention can be produced more satisfactorily when the shape of the slanting line area in the figure is enlarged.

In the embodiments (b) and (c) mentioned above, the material for constituting the lamp holder is not particularly restricted but may be a soft material such as a Si rubber or a material higher in strength than a Si rubber, for example a polycarbonate.

Suited for use as the light source lamp are, for example, fluorescent tubes such as cold cathode fluorescent tubes and hot cathode fluorescent tubes. As the light source lamp having a curved portion, there may be mentioned, for example, U-shaped tube light source lamps, S-shaped tube light source lamps, and W-shaped tube light source lamps. The use of such light source lamps makes it possible to reduce the number of parts and at the same time, it becomes possible to reduce the total number of electrodes of light source lamps and thereby reduce the electricity consumption in the lighting unit as a whole. Among them, U-shaped tubes are preferred and the use thereof makes it possible to produce such effects as reduction in electricity consumption while preventing the production yield of light source lamps from decreasing. Further, when U-shaped tubes or the like are used, the electrodes of the light source lamps can be collected on one side and, accordingly, the driving circuit can be concentrated on one side. On the contrary, when S-shaped tubes or the like are used, the electrodes of the light source lamps are disposed on both sides, hence the optical characteristics of the light emitted from the light source lamps can be made uniform with advantage.

A mode of disposition of the light source lamps which is preferred from the viewpoint of uniformity of light is that mode in which the light source lamps are disposed with the straight portions thereof being parallel and at regular intervals.

The lamp holder is preferably formed of an insulating resin. In cases where the light source lamp can be insulated from the substrate member on which the lamp holder is disposed, the lamp holder may be one only partly made of an insulating resin. Suitable as the insulating resin are elastic materials having freedom and capable of absorbing shock, for example a rubber material and, in this case, inconveniences caused by the weak shock resistance of the light source lamps can be eliminated to a satisfactory extent. A material having plasticity is also preferred. In the practice of the invention, the lamp holder(s) and backlight angle may be provided as separate members or, when the backlight angle is made of an insulating resin such as a polycarbonate, the lamp holder(s) and backlight angle may be formed in an integrated manner.

Figure 9A:
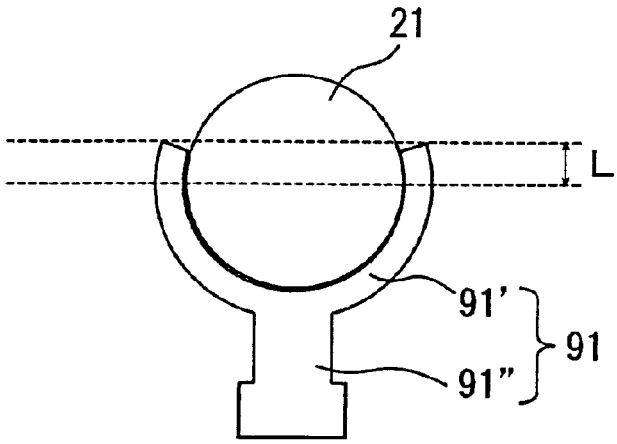
FIG. 9A is an explanatory drawing showing the range L of supporting of the upper part of a light source lamp in a supporting member of a lamp holder.
Figure 9B:
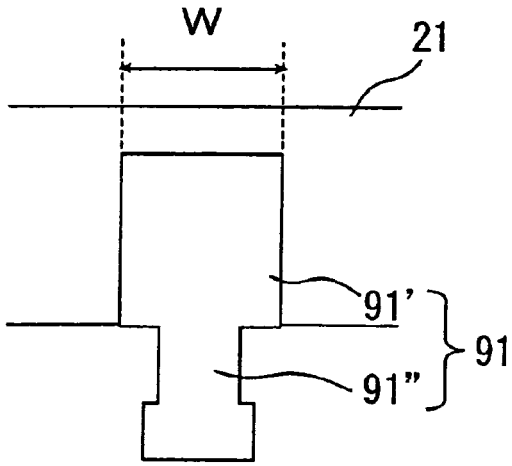
FIG. 9B is an explanatory drawing showing the length W, in the light source lamp direction, of a supporting member of a lamp holder.
Figure 10:
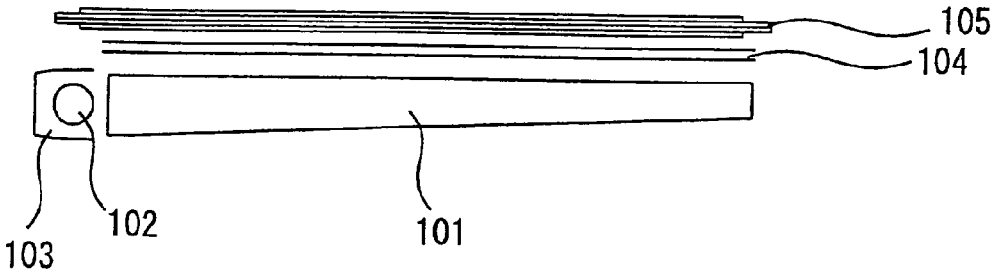
FIG. 10 is a schematic sectional view showing the essential constituent elements of an edge light type backlight.
Figure 11:
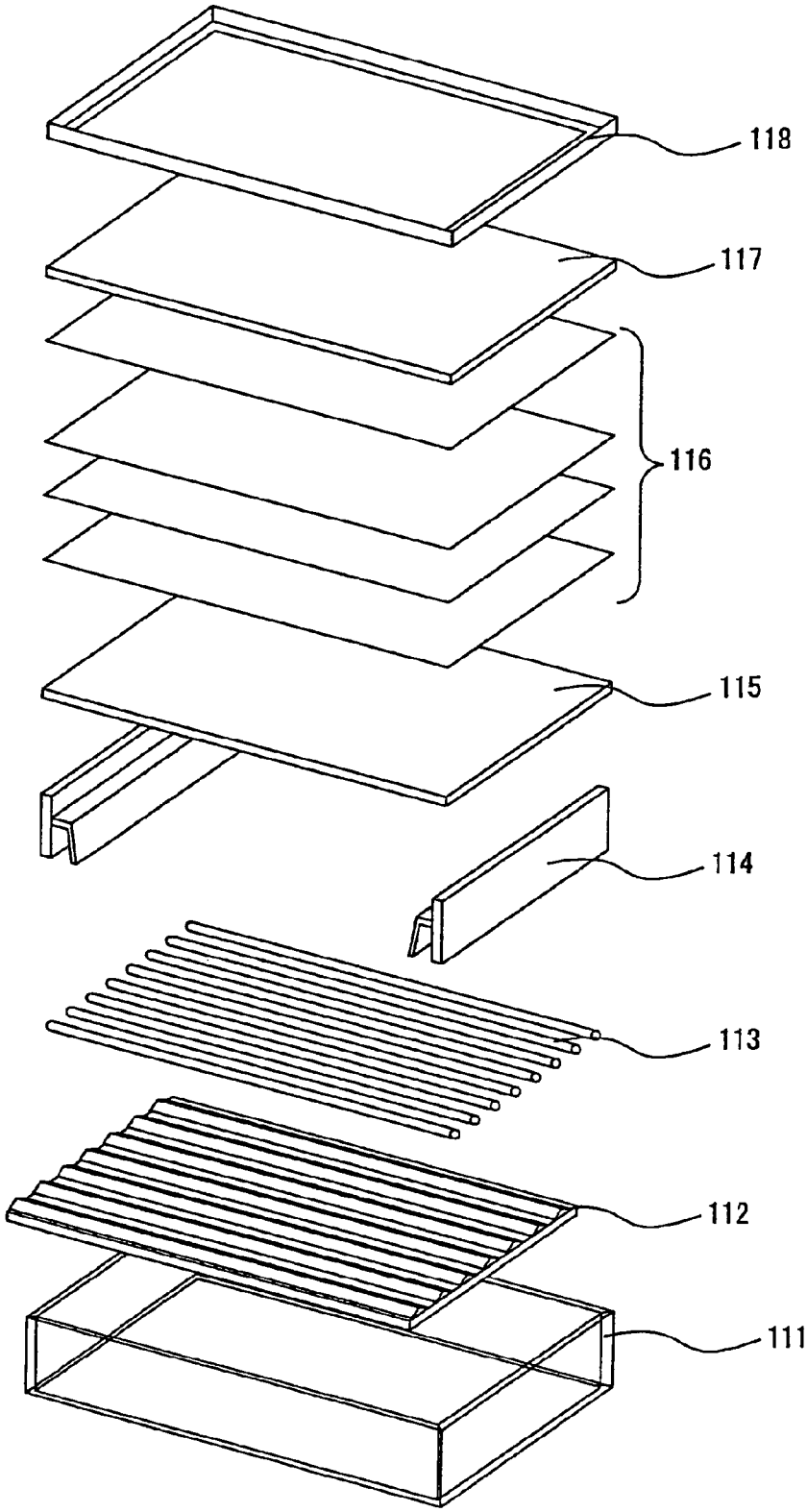
FIG. 11 is a schematic perspective exploded view showing the essential constituent elements of a direct type backlight.
Figure 12:
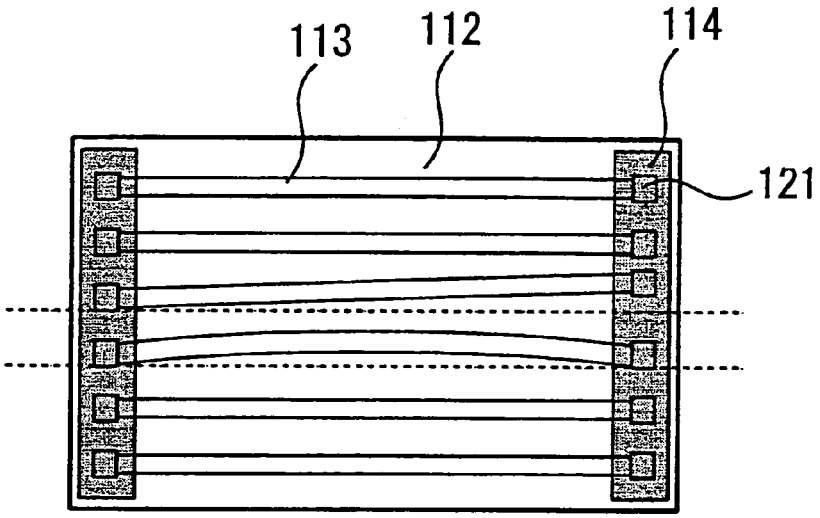
FIG. 12 is a schematic plan view showing a direct type backlight in a state of deviations in light source lamps.
Figure 13:
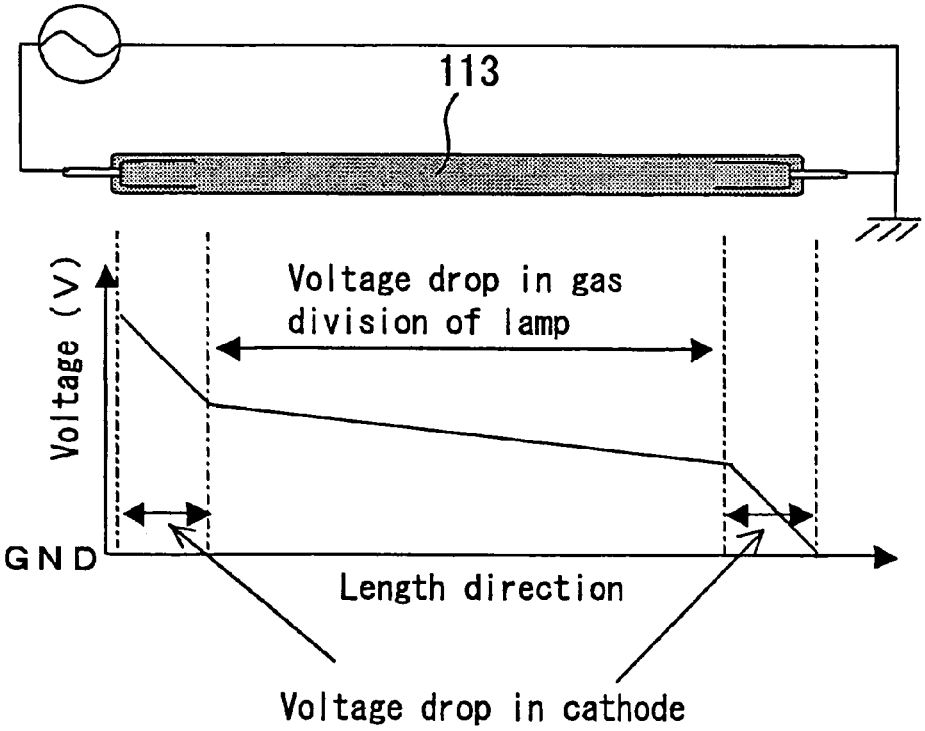
FIG. 13 is a graphic representation of the relation between the length of a cold cathode fluorescent tube and the voltage drop.

Further, the supporting members of the lamp holder preferably have a notch, namely the supporting members preferably support the light source lamps by means of their arch-shaped holding sections having a partial opening. In this way, it becomes possible to mount the light source lamps after fixation of the lamp holder(s). In this case, each light source lamp is preferably supported in the supporting member(s) of each lamp holder to a level above the central line of the light source lamp, as shown in FIG. 9A. Namely, it is desirable that the supporting range L for the upper portion of the light source lamp in the supporting member exceed 0 mm. Further, it is desirable that the length W of each supporting member in the direction of the light source lamp be not longer than 10 mm, as shown in FIG. 9B. In these embodiments, it is possible to prevent the loss of light and thereby attain efficient light utilization while attaining a sufficient level of light source lamp supporting strength.

The lamp holder is preferably disposed at least at each end portion of the light source lamp in order to sufficiently fix the light source lamp. For further adequate supporting of the light source lamp, an additional lamp holder is more preferably disposed at a site other than the end portions. The lamp holders disposed at the respective sites may differ in shape and/or material or may be the same in shape and material.

In a preferred embodiment of the display device lighting unit described above, a part of the light source lamp(s) is housed, together with the lamp holder(s), in a housing frame. Suitable as the housing frame is one disposed at the end portions of a reflector, and the terminal portions of the light source lamp and the lamp holder(s) supporting the same are housed therein. As preferred embodiments of the lamp holder (s) housed in the housing frame, there may be mentioned the embodiment (p) in which the lamp holder(s) has a shape such that it can fill up the space between a part of the light source lamp and the housing frame, the embodiment (q) in which the lamp holder has at least one projection on the housing frame side and the projection fits or penetrates the housing frame, the embodiment (r) in which the lamp holder is stuck on (pasted) and housed in the housing frame, and combinations of (p) to (r). In the embodiment (r), the lamp holder may be pasted to the substrate on which the housing frame is mounted, if the lamp holder can be fixed.

In these embodiments, each lamp holder preferably supports the curved portion, for example the U-shaped curved portion, of a light source lamp having a curved shape, such as a U-shaped tube and it is preferably made of an insulating resin.

In these embodiments, each light source lamp can be inhibited from coming into direct contact with the housing frame and other parts, the deviations in assemblage in the manufacturing process can be effectively prevented and, furthermore, the shock resistance of the light source lamps and of the state of disposition thereof can be improved.

Each lamp holder disposed in the display range is preferably transparent or white so that the display quality of the display device can be prevented from lowering. Further, the lamp holders disposed in the display range are preferably integrated with a transparent or white, conical or other supporting element (reinforcing supporting element). By providing such supporting element (reinforcing supporting element), it becomes possible to support the diffuser and other parts from below together with the housing frame and other parts to thereby prevent the display quality of the display device from deteriorating as a result of bending of the diffuser etc. The lamp holders integrated with the supporting element (reinforcing supporting element) are preferably positioned alternately so that the effects of supporting the diffuser and other parts may be fully produced while preventing the display quality of the display device from deteriorating due to the shadow of the supporting element (reinforcing supporting element).

When, in the practice of the invention, the light source lamps are supported in the display region using C rings which do not fix them to the backlight angle (sheet metal), sufficient fixation becomes important in particular in the end portions of the lamps. Therefore, when the light source lamps are not fixed to the backlight angle in the display region, in particular when the light source lamps are supported in the display region by means of C rings, the embodiment in which the light source lamps are supported at both ends or one end, more preferably at both ends, of each lamp by means of such lamp holders as mentioned above is a preferred embodiment of the present invention.

As mentioned hereinabove, the display device lighting unit of the invention can be applied to an edge light type backlight. In the following, preferred forms of the edge light type backlight are described in detail, referring to the drawings.

Figure 18A:
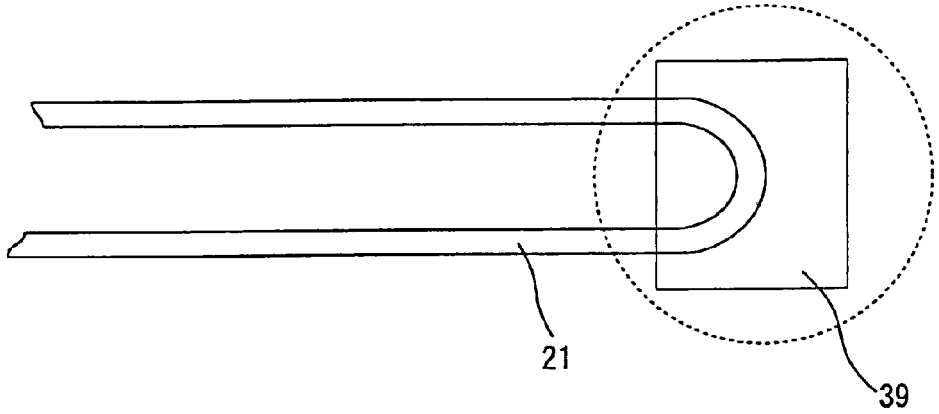
FIG. 18A is a schematic side view showing an example of the mode of supporting a light source lamp having a curved portion in the curved portion thereof in an edge light type backlight having the light source lamp having a curved portion as disposed at least one side thereof.
Figure 18B:
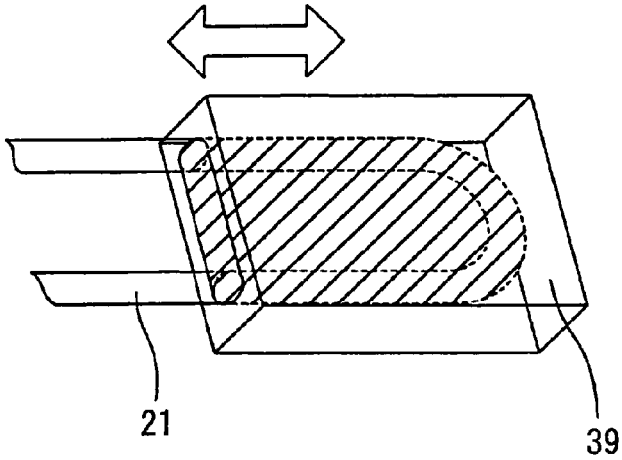
FIG. 18B is a schematic perspective view showing, as an enlargement, the vicinity of the supporting member (the portion surrounded by dotted lines in FIG. 18A) of the lamp holder shown in FIG. 18A.
Figure 18C:
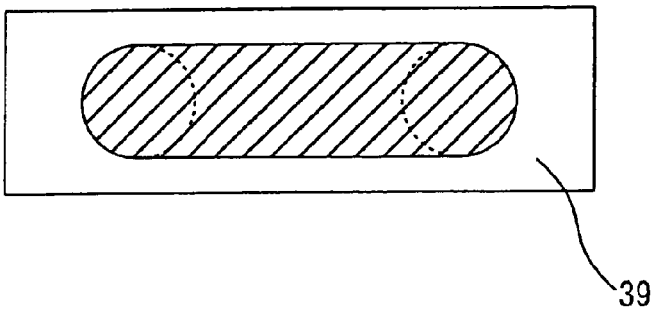
FIG. 18C is a schematic front view showing the hollow forming face of a supporting member of the lamp holder shown in FIG. 18A.

In the case of application to the edge light type backlight in the practice of the invention, the embodiment in which the lamp holder has a hollow (supporting member), the light source lamp has a curved shape and the curved portion is fitted (inserted into) and supported by the hollow of the lamp holder is preferred. In this way, it becomes possible to minimize deviations in assemblage while taking the lamp mounting in the step of assemblage into consideration. FIGS. 18A and 18B show an example of the mode of supporting a light source lamp having a curved portion in the curved portion thereof in an edge light type backlight having the light source lamp having a curved portion as disposed at least one side thereof. In the embodiment shown in FIGS. 18A and 18B, the light source lamp can be mounted by sliding the same in the direction of the outlined arrow shown in FIG. 18B using a lamp holder having a hollow in the inside (the slanting line area in FIGS. 18B and 18C), as shown in FIG. 18C, without making a hollow having the shape of a lamp and providing a notch. While, in FIGS. 18A and 18B, the hollow of the lamp holder has a U-shaped form according to the shape of the lamp, the shape of the hollow is not particularly restricted provided that the light source lamp can be inserted and supported-therein. When the curved portion of the lamp has a angular U-shaped form, for instance, the hollow may have the form of a rectangular parallelepiped. A rubber holder made of a Si resin, for instance, is judiciously used as such lamp holder.

Such mode of supporting a light source lamp by inserting the curved portion thereof into the hollow of a lamp holder can be applied not only to the edge light type backlight but also to the direct type backlight.

Figure 19A:
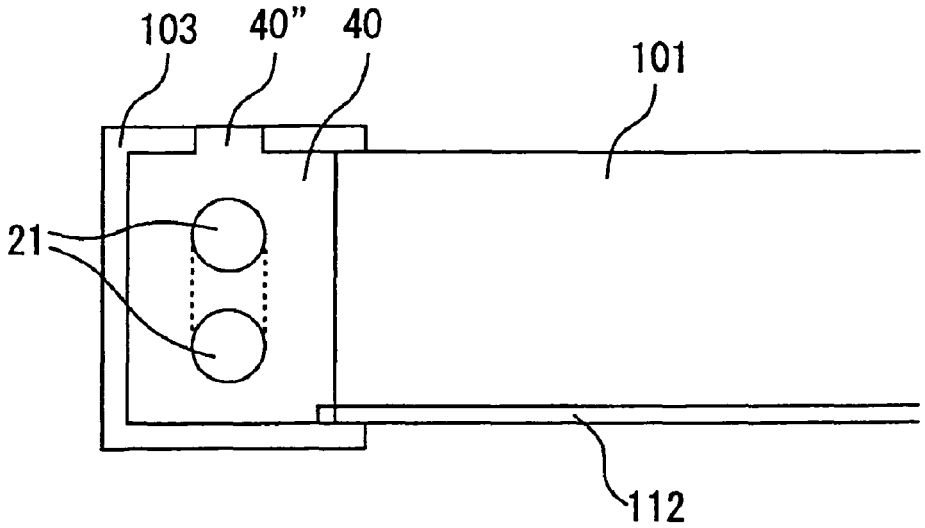
FIG. 19A is a schematic sectional view showing an example of the mode of fixing a lamp holder in an edge light type backlight having a light source lamp having a curved portion as disposed at least one side thereof.
Figure 19B:
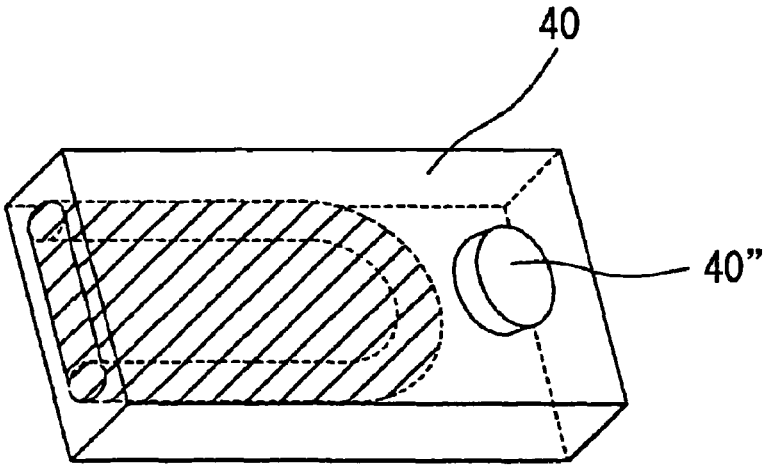
FIG. 19B is a schematic perspective view showing an example of the lamp holder having a projection on the side face (on the face opposite to the light guide plate).
Figure 20:
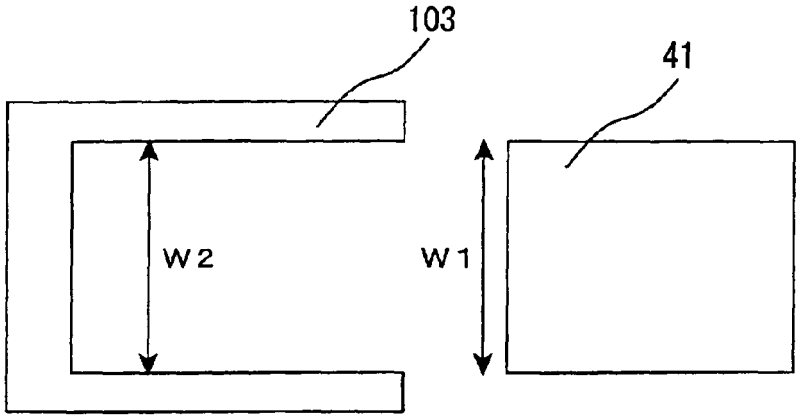
FIG. 20 is a schematic view showing an example of the combination of a reflector (housing frame) and a lamp holder which can be fitted into the reflector.

When the display device lighting unit of the invention is applied to an edge light type backlight, the lamp holder having a hollow is preferably inserted into a housing frame for fixation thereof. In this mode, the external size (W1 in FIG. 20) of the lamp holder is almost the same as the internal size of the reflector (W2 in FIG. 20), as shown in FIG. 20, and these are aligned with each other for insertion and fixation. In this mode, the lamp holder preferably has a projection on the housing frame side for insertion or penetration thereof into or through the housing frame for fixation. When, in this manner, the lamp holder is inserted into and fixed in the housing frame and at the same time the projection of the lamp holder is aligned against the depression in the reflector, a backlight can be provided precisely at a low level of deviation. FIG. 19A is a schematic sectional view showing an example of the mode of fixing a lamp holder in an edge light type backlight having a light source lamp having a curved portion as disposed at least one side thereof. In the mode shown in FIG. 19A, a lamp holder 40 having a projection (fixing member) 40" on the upper face (display face side) is used, and alignment is effected by penetrating the projection 40" through a hole of the lamp reflector (housing frame) 103, whereby deviations in assemblage are effectively inhibited. The site of formation of the projection 40" may be on the side face of the lamp holder (reverse side face relative to the light guide plate), as shown in FIG. 19B. As preferred forms of the lamp holder to be housed in the housing frame, there may be mentioned, in addition to the abovementioned embodiment (q) in which the lamp holder has a projection on the housing frame side and is housed in the housing frame with the projection fitting or penetrating the housing frame, the above-mentioned embodiment (p) in which the space between a part of the light source lamp and the housing frame is filled up by the holder, the above-mentioned embodiment (r) in which the lamp holder is housed in the housing frame in the manner of pasting, and combinations of (p) to (r), among others. In these modes, deviations can be inhibited by effectively aligning the lamp holder and light source lamp with each other.

Figure 21A:
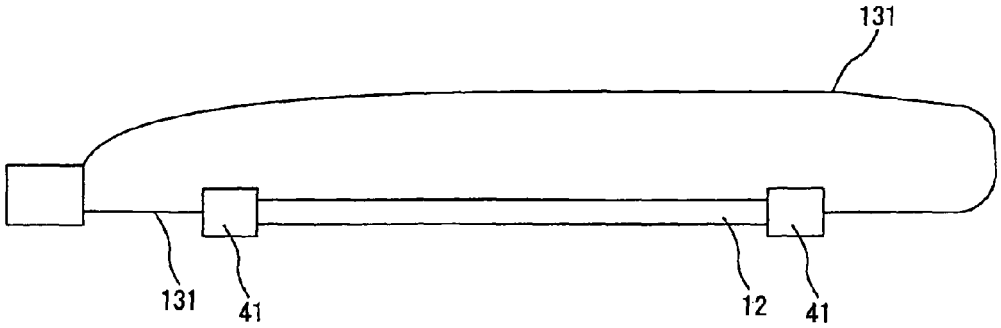
FIG. 21A is a schematic view showing the routes of GND harness wires.
Figure 21B:
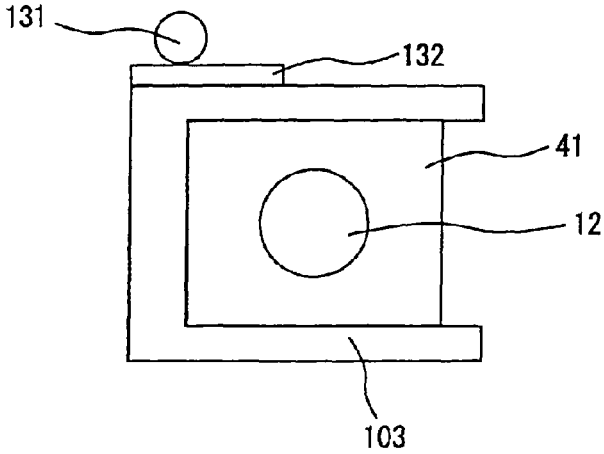
FIG. 21B is a schematic sectional view showing the state of a lamp holder fixed in a reflector (housing frame) with a GND harness wire stuck thereto.

When a straight tube light source lamp is used, a double coated adhesive tape for fixing GND harness wires is used, as shown in FIGS. 21A and 21B. In cases where a U-shaped tube light source lamp is used, the use of the double coated adhesive tape for GND harness wire fixation may be omitted.

The present invention also relates to the above-mentioned lamp holders for use in display device lighting units. Such lamp holders are suited for use in constituting display device lighting units, in particular backlights in liquid crystal display devices of the transmission or semitransmission type in which liquid crystal display elements have a transmission region, and therefore are useful as parts or members for constituting favorable display device lighting units.

The invention further relates to liquid crystal display devices comprising such a display device lighting unit as mentioned above. The effects producible with such liquid crystal display devices include reduction in the number of parts, reduction in electricity consumption, prevention of deviations in assemblage in the manufacturing process, and improvements in shock resistance and display quality, among others. Furthermore, they can be advantageously used as liquid crystal display devices of the transmission or semitransmission type which have a structure such that the light source lamp can be housed effectively and easily, for example in household video monitors, monitors for industrial machines, and display panels in portable information terminals.

The display device lighting unit of the invention has the constitution described above and a plurality of supporting members are integrated into one piece and, therefore, the number of parts can be reduced, light source lamps can be disposed precisely at regular intervals with ease while maintaining the supporting members at a constant interval or intervals, and display devices excellent in display quality can be provided at low cost. Further, by supporting the curved portion of each light source lamp by means of supporting members, it becomes possible to support the light source lamps effectively and precisely and, further, improve the shock resistance of the light source lamps and the state of disposition thereof. Furthermore, by employing the embodiment in which the lamp holder is fixed in the display device lighting unit after fixation of the light source lamp on the supporting member(s) of the lamp holder, for example the embodiment in which at least one of the fixing members of the lamp holder has a structure resulting from division into two, or by supporting the curved portion of the light source lamp by means of a plurality of supporting members of a lamp holder, or by supporting the curved portion, in the manner of covering along the shape thereof, by a supporting member of a lamp holder, it becomes possible to improve with respect to deviations in lamp mounting and improve the display quality while facilitating the lamp mounting in the step of assemblage. And, when the supporting member of a lamp holder has means for reducing the lamp supporting area, the quantity of heat diffused from the light source lamp through the lamp holder can be reduced and the temperature distribution of the light source lamp can be made more uniform, so that it becomes possible to improve the uniformity of brightness of the lighting unit.

In the following example, typical preferred embodiments of the display device lighting unit of the invention are described in detail, referring to the drawings. However, the display device lighting unit of the invention is not limited to these examples but includes, for example, those embodiments resulting from combination of these examples.

Figure 1B:
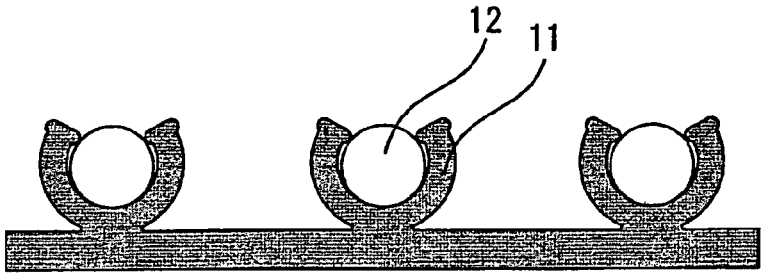
FIG. 1B is a schematic sectional view of the lamp holder shown in FIG. 1A.
Figure 2:
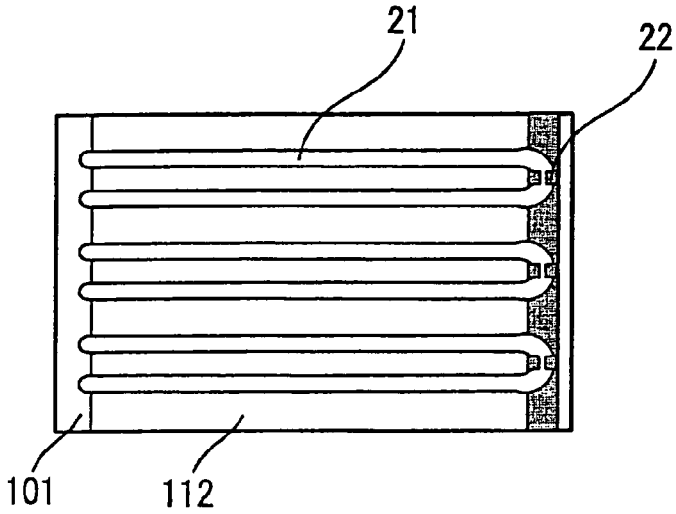
FIG. 2 is a schematic plan view showing another example of the lamp holder having supporting members integrated into one piece in the display device lighting unit of the invention.
Figure 4:
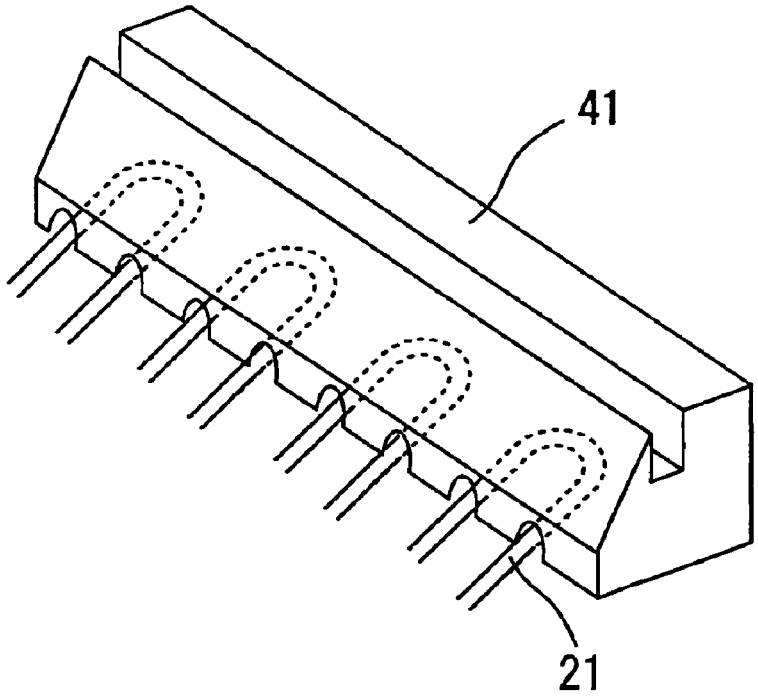
FIG. 4 is a schematic perspective view showing an example of the housing frame in the display device lighting unit of the invention.
Figure 5:
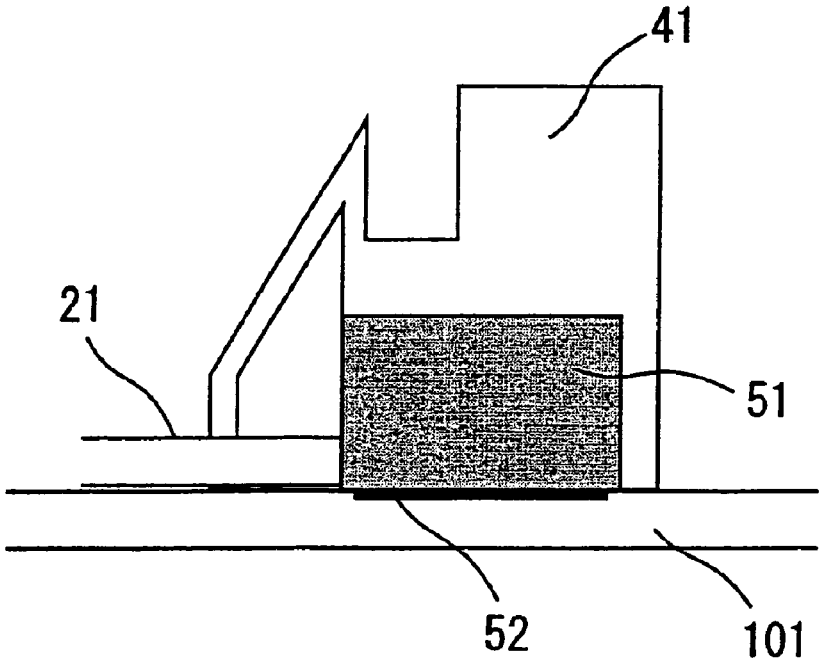
FIG. 5 is a schematic sectional view showing an example of the mode of housing of a lamp holder in the housing frame by pasting in the display device lighting unit of the invention.
Figure 6:
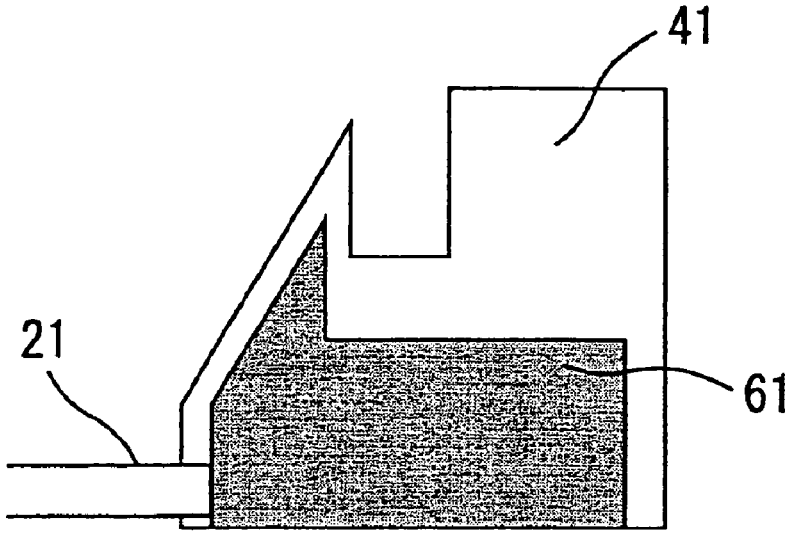
FIG. 6 is a schematic sectional view showing an example of the mode of housing, in the housing frame, of a lamp holder having a shape capable of filling up the space between the lamp holder and light source lamp in the display device lighting unit.
Figure 7:
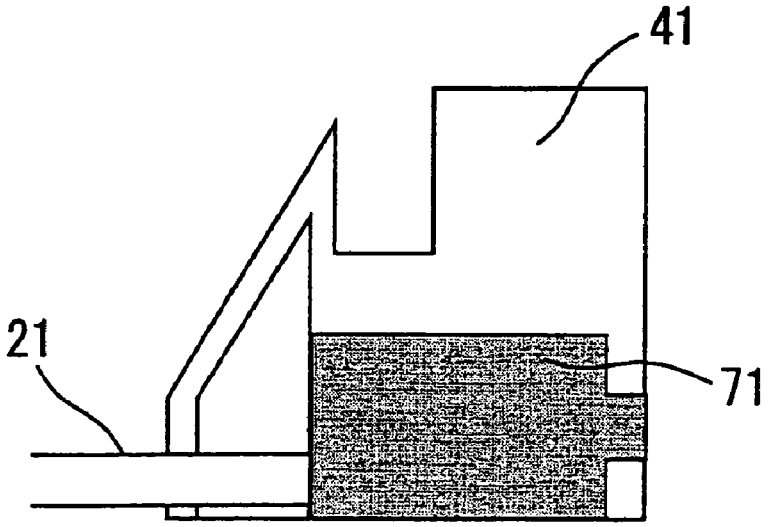
FIG. 7 is a schematic sectional view showing an example of the mode of housing of a lamp holder having a projection by penetration of the projection through the housing frame in the display device lighting unit of the invention.

FIG. 1A is a schematic plane view showing an example of the lamp holder having supporting members integrated into one piece in the display device lighting unit of the invention. FIG. 1B is a schematic sectional view of the lamp holder shown in FIG. 1A. FIG. 2 is a schematic plan view showing another example of the lamp holder having supporting members integrated into one piece in the display device lighting unit of the invention. FIG. 3A and FIG. 3B each is a schematic perspective view showing an example of the lamp holder for supporting the U-shaped curved portion of a U-shaped fluorescent tube in the display device lighting unit of the invention. FIG. 4 is a schematic perspective view showing an example of the housing frame in the display device lighting unit of the invention. FIG. 5 is a schematic sectional view showing an example of the mode of sticking a lamp holder on the housing flame and housing of a lamp holder in the housing frame in the display device lighting unit of the invention. FIG. 6 is a schematic sectional view showing an example of the mode of housing, in the housing frame, of a lamp holder having a shape capable of filling up the space between the housing frame and a part of light source lamp in the display device lighting unit of the invention. FIG. 7 is a schematic sectional view showing an example of the mode of housing of a lamp holder having a projection on the housing flame side by penetration of the projection through the housing frame in the display device lighting unit of the invention. FIG. 8A and FIG. 8B each is a schematic perspective view showing an example of the lamp holder having projections on the supporting member.

FIG. 14 includes schematic perspective views of some modes of embodiment in which deviations in lamp mounting position are made difficult to occur in the display device lighting unit of the invention. FIG. 14A shows the shape of a lamp holder when the lamp holder is fixed within the display device lighting unit after light source lamp fixation on a supporting member of the lamp holder. FIG. 14B shows the mode of supporting of the curved portion of a light source lamp as supported on a plurality of supporting members of a lamp holder, and FIG. 14C shows the mode of supporting of the curved portion of a light source lamp as supported on a supporting member of a lamp holder in a manner such that the curved portion is covered by the supporting member along the curved shape thereof.

As the direct type liquid crystal display device constituted by using the display device lighting unit of the invention, there may be mentioned, for example, a liquid crystal display device having a structure such that a highly reflecting resin 112 is disposed on a sheet metal 111, U-shaped tubes 21 whose terminal portions are coated with an insulating resin are disposed thereon by means of a housing frame (lamp frame) 114 and, further thereon, there are disposed a diffuser 115, various sheets 116 such as a diffusing sheet, condensing lens, light polarization-selective reflecting/transmitting sheet, protective/diffusing sheet, electromagnetic shielding sheet (conductive sheet, ITO sheet), etc., a liquid crystal panel element 117, a frame 118 and so forth, in that order.

EXAMPLE 1

A lighting unit was constituted by placing, in the display region of a liquid crystal display device having a lighting unit at the back of the liquid crystal display element, a white lamp holder 11 made of an insulating resin and morphologically capable of supporting a plurality of straight tube type fluorescent tubes 12 on a highly reflecting resin 112 and disposing a plurality of straight tube type fluorescent tubes 12 thereon in parallel and at regular intervals, as shown in FIG. 1.

In this example and the subsequent examples, the shape, material, number and positions of the lamp holders made of an insulating resin are not restricted in any way in the modes of embodiment of the invention. The liquid crystal display device may have either a direct type backlight or an edge light type backlight having a U-shaped lamp or a plurality of U-shaped lamps.

According to such constitution, lamps are supported by a lamp holder resulting from integration of a plurality of supporting members into one piece and therefore the number of parts can be reduced and, further, light source lamps can be disposed precisely at regular intervals; thus, liquid crystal display devices excellent in display quality can be provided at low cost.

EXAMPLE 2

A lighting unit was constituted by disposing, in the non-display region of a liquid crystal display device having a lighting unit at the back of a liquid crystal display element, the supporting members of a lamp holder 22 made of an insulating resin and morphologically capable of supporting a plurality of U-shaped fluorescent tubes (U-shaped tube light source lamps) 21 on a sheet metal 111 and disposing U-shaped fluorescent tubes 21 thereon in parallel and at regular intervals, as shown in FIG. 2.

According to such constitution, lamps are supported by a lamp holder resulting from integration of a plurality of supporting members into one piece and therefore the number of parts can be reduced and, further, light source lamps can be disposed precisely at regular intervals; thus, liquid crystal display devices excellent in display quality can be provided at low cost.

EXAMPLE 3

On the occasion of inserting the U-shaped curved portion of a U-shaped fluorescent tube 21, which is the light source lamp, into a housing frame 41 in the section for housing the fluorescent tube 21 into the housing frame 41 in a liquid crystal display device having a lighting unit at the back of a liquid crystal display element, the U-shaped curved portion of the U-shaped fluorescent tube 21 was supported by a lamp holder 31, 33, 34 or 35 made of an insulating resin and inserted, in that state, into the housing frame 41, as shown in FIG. 3. A lighting unit was thus constituted.

According to such constitution, that portion of a U-shaped fluorescent tube which is to be housed in a housing frame is housed via a lamp holder made of an insulating resin, so that the U-shaped curved portion of the U-shaped fluorescent tube can be prevented from coming into contact with the housing frame; a good liquid crystal display device can thus be provided.

EXAMPLE 4

On the occasion of inserting the U-shaped curved portion of each U-shaped fluorescent tube 21, which is the light source lamp, into a housing frame 41 in the section for housing the fluorescent tube 21 into the housing frame 41 in the same liquid crystal display device as referred to in Example 3, the U-shaped curved portion of each U-shaped fluorescent tube 21 was supported by a lamp holder 51 made of an insulating resin and, in that state, the lamp holder 51 was housed in the housing frame 41 by pasting, as shown in FIGS. 4 and 5. A lighting unit was thus constituted.

In this example and the subsequent examples, in which the mode of embodiment of the invention involves pasting of a lamp holder(s), the shape, material, number and position(s) of the adhesive or pressure-sensitive adhesive materials to be used are not restricted in any way. The member to serve as the target of pasting is not restricted, either.

According to such constitution, that portion of a U-shaped fluorescent tube which is to be housed in a housing frame is housed via a lamp holder made of an insulating resin, so that the U-shaped curved portion of the U-shaped fluorescent tube can be prevented from coming into contact with the housing frame and, further, by pasting the lamp holder to the housing frame, it becomes possible to produce such effects as standardization of assemblage works in the manufacturing process and stabilization of the display quality. It is possible to provide good liquid crystal display devices excellent in shock resistance and precision in assemblage, among others.

EXAMPLE 5

On the occasion of inserting the U-shaped curved portion of each U-shaped fluorescent tube 21, which is the light source lamp, into a housing frame 41 in the section for housing the fluorescent tube 21 into the housing frame 41 in the same liquid crystal display device as referred to in Example 3, the U-shaped curved portion of each U-shaped fluorescent tube 21 was supported by a lamp holder 61 made of an insulating resin and morphologically capable of filling up the space between the housing frame 41 and the U-shaped curved portion of the U-shaped fluorescent tube 21 and the whole was inserted, in that state, into the housing frame 41, as shown in FIG. 6. A lighting unit was thus constituted.

According to such constitution, the U-shaped curved portion of each U-shaped fluorescent tube is supported by a lamp holder made of an insulating resin and morphologically capable of filling up the space between the housing frame and the U-shaped curved portion of the U-shaped fluorescent tube, so that the U-shaped curved portion of the U-shaped fluorescent tube can be prevented from coming into contact with the housing frame and, further, the U-shaped curved portion of each U-shaped fluorescent lamp is fixed, with the result that it becomes possible to produce such effects as standardization of liquid crystal display device assembling works and stabilization of the display quality and it becomes possible to provide good liquid crystal display devices excellent in shock resistance and precision in assemblage, among others.

EXAMPLE 6

On the occasion of inserting the U-shaped curved portion of each U-shaped fluorescent tube 21, which is the light source lamp, into a housing frame 41 in the section for housing the fluorescent tube 21 into the housing frame 41 in the same liquid crystal display device as referred to in Example 3, the U-shaped curved portion of each U-shaped fluorescent tube 21 was supported by a lamp holder 61 made of an insulating resin and morphologically capable of filling up the space between the housing frame 41 and the U-shaped curved portion of the U-shaped fluorescent tube 21 and, in that state, the lamp holder was housed in the housing frame 41 by pasting. A lighting unit was thus constituted.

According to such constitution, the U-shaped curved portion of each U-shaped fluorescent tube is supported by a lamp holder made of an insulating resin and morphologically capable of filling up the space between the housing frame and the U-shaped curved portion of the U-shaped fluorescent tube and the lamp holder is stuck on (pasted to) the housing frame, so that the U-shaped curved portion of the U-shaped fluorescent tube can be prevented from coming into contact with the housing frame and, further, the U-shaped curved portion of each U-shaped fluorescent lamp is fixed, with the result that it becomes possible to produce such effects as standardization of liquid crystal display device assembling works and stabilization of the display quality and it becomes possible to provide good liquid crystal display devices excellent in shock resistance and precision in assemblage, among others.

EXAMPLE 7

On the occasion of inserting the U-shaped curved portion of each U-shaped fluorescent tube 21, which is the light source lamp, into a housing frame 41 in the section for housing the fluorescent tube 21 into the housing frame 41 in the same liquid crystal display device as referred to in Example 3, the U-shaped curved portion of each U-shaped fluorescent tube 21 was supported by a lamp holder 71 made of an insulating resin and morphologically capable of filling up the space between the housing frame 41 and the U-shaped curved portion of the U-shaped fluorescent tube 21 and further having a projection and, in that state, the lamp holder 71 was housed in the housing frame 41 provided with a through-hole for fitting of the projection therein, with the projection thus penetrating the hole, as shown in FIG. 7. A lighting unit was thus constituted.

In this example and the subsequent examples, in which the mode of embodiment of the invention involves the use of a lamp holder having a projection, the shape, number and position(s) of projections and through-holes are not restricted in any way. The member or members to be provided with a through-hole or holes are not restricted, either.

According to such constitution, the U-shaped curved portion of each U-shaped fluorescent tube is supported by a lamp holder made of an insulating resin and morphologically capable of filling up the space between the housing frame and the U-shaped curved portion of the U-shaped fluorescent tube, so that the U-shaped curved portion of the U-shaped fluorescent tube can be prevented from coming into contact with the housing frame and, further, the U-shaped curved portion of each U-shaped fluorescent lamp is fixed also by penetration of the projection, with the result that it becomes possible to produce such effects as standardization of liquid crystal display device assembling works and stabilization of the display quality, and it is possible to provide good liquid crystal display devices excellent in shock resistance and precision in assemblage, among others.

EXAMPLE 8

On the occasion of inserting the U-shaped portion of each U-shaped fluorescent tube 21, which is the light source lamp, into a housing frame 41 in the section for housing the fluorescent tube 21 into the housing frame 41 in the same liquid crystal display device as referred to in Example 3, the U-shaped portion of each fluorescent tube 21 was supported by a lamp holder 71 made of an insulating resin and morphologically capable of filling up the space between the housing frame 41 and the U-shaped portion of the fluorescent tube 21 and further having a projection and, in that state, the lamp holder 71 was housed, by pasting, in the housing frame 41 provided with a through hole for fitting of the projection therein, with the projection thus penetrating the hole. A lighting unit was thus constituted.

According to such constitution, the U-shaped portion of each fluorescent tube is supported by a lamp holder made of an insulating resin and morphologically capable of filling up the space between the housing frame and the U-shaped portion of the fluorescent tube and the lamp holder is pasted to the housing frame, so that the U-shaped portion of the fluorescent tube can be prevented from coming into contact with the housing frame and, further, the U-shaped portion of each fluorescent lamp is fixed also as a result of penetration of the projection, with the result that it becomes possible to produce such effects as standardization of liquid crystal display device assembling works and stabilization of the display quality and it becomes possible to provide good liquid crystal display devices excellent in shock resistance and precision in assemblage, among others.

EXAMPLE 9

A lighting unit was constituted by disposing, in the display region of a liquid crystal display device having a lighting unit at the back of a liquid crystal display element, white lamp holders 81 or 83 each provided with a plurality of projections 82 or 84, as shown in FIG. 8, and made of an insulating resin, on a reflector, and disposing straight fluorescent tubes 12 thereon in parallel and at regular intervals.

According to such constitution, lamps are supported by lamp holders provided with a plurality of projections and therefore the heat diffused from each light source lamp through the lamp holders can be reduced and the temperature distribution in each light source lamp can be rendered uniform; thus, it is possible to improve the uniformity in brightness of each lighting unit and thereby provide liquid crystal display devices excellent in display quality.

EXAMPLE 10

Example 10 refers to some modes of embodiment according to which lamp mounting is made easy and improvements can be attained with respect to deviations in lamp mounting in the step of assemblage.

FIG. 14A shows an example in which each lamp holder 36 is formed of a material having freedom, such as a Si rubber, and the lamp holder can be fixed to a backlight angle after lamp fixation on a supporting member of the lamp holder. This structure leads to an improvement with respect to deviations in lamp mounting in the direction of the Z axis.

FIG. 14B shows an example in which a lamp is supported on a lamp holder 37a having a plurality of supporting members to thereby restrict deviations in the X and Y axis directions. The sites of lamp fixation and the number of fixations are not restricted so long as the effects of the invention can be produced. In this case, the supporting members 37a' of the lamp holder are integrated.

FIG. 14C shows an example in which a light source lamp 21 is supported by a lamp holder 38a in the manner of its covering the curved portion.

The invention claimed is:

1. A display device lighting unit, comprising:

a light source lamp; and a lamp holder having a first supporting member and a second supporting member, for supporting the light source lamp, formed on a common base, wherein, said light source lamp has a curved portion having a curved shape, and the lamp holder supports the light source lamp at the curved portion, and wherein, the first supporting member and the second supporting member are provided on the common base such that a center axis of the first supporting member crosses a center axis of the second supporting member.

2. A display device lighting unit, comprising:

a fluorescent tube; and a lamp holder having a supporting member for supporting the fluorescent tube and a fixing member, wherein, the supporting member has a first end and a second end, the supporting member arches over such that the second end substantially faces the first end, and the fixing member has a first fixing member that extends from the first end and a second fixing member that extends, from the second end, substantially parallel with the first fixing member, wherein the supporting member, the first fixing member and the second fixing member are a single part.

3. The display device lighting unit according to claim 1, wherein said light source lamp is a U-shaped tube light source lamp.

*4. A lighting unit comprising:*

*at least one fluorescent tube including a U-shaped curved portion;*

*at least one optical sheet; and*

*at least one housing frame being arranged to house the U-shaped curved portion of the at least one fluorescent tube, and including:*

*a first opening or recess in which a first straight portion extending from the U-shaped curved portion of the at least one fluorescent tube is accommodated;*

*a second opening or recess in which a second straight portion extending from the U-shaped curved portion of the at least one fluorescent tube is accommodated; and*

*at least one support surface on which the at least one optical sheet is placed;*

*wherein*

*the at least one housing frame includes a sloped portion arranged to face the at least one optical sheet.*

*5. A display device comprising a lighting unit, the lighting unit comprising:*

*at least one fluorescent tube including a U-shaped curved portion;*

*at least one optical sheet; and*

*at least one housing frame being arranged to house the U-shaped curved portion of the at least one fluorescent tube, and including:*

*a first opening or recess in which a first straight portion extending from the U-shaped curved portion of the at least one fluorescent tube is accommodated;*

*a second opening or recess in which a second straight portion extending from the U-shaped curved portion of the at least one fluorescent tube is accommodated; and*

*at least one support surface on which the at least one optical sheet is placed;*

*wherein*

*the at least one housing frame includes a sloped portion arranged to face the at least one optical sheet.*

*6. A display device lighting unit, comprising:*

*a fluorescent tube; and*

*a lamp holder including a supporting member defined by a single part curved structure with a center position of the single part curved structure being arranged at a bottom of the supporting member, the single part curved structure of the supporting member being arranged to support the fluorescent tube; wherein*

*the single part curved structure of the supporting member includes only five projections that extend toward the fluorescent tube on a surface facing the fluorescent tube;*

*one of the only five projections is located at the center position of the single part curved structure of the supporting member to support the fluorescent tube from below the fluorescent tube; and*

*a light emitting portion of the fluorescent tube is in contact with and is supported by tops of the only five projections.*

*7. The display device lighting unit according to claim 6, wherein the lamp holder includes a plurality of supporting members, and each of the plurality of supporting members includes only five projections.*

*8. A display device comprising a display device lighting unit, the display device lighting unit, comprising:*

*a fluorescent tube; and*

*a lamp holder including a supporting member defined by a single part curved structure with a center position of the single part curved structure being arranged at a bottom of the supporting member, the single part curved structure of the supporting member being arranged to support the fluorescent tube; wherein*

*the single part curved structure of the supporting member includes only five projections that extend toward the fluorescent tube on a surface facing the fluorescent tube;*

*one of the only five projections is located at the center position of the single part curved structure of the supporting member to support the fluorescent tube from below the fluorescent tube; and*

*a light emitting portion of the fluorescent tube is in contact with and is supported by tops of the only five projections.*

* * * * *